Figure 1:
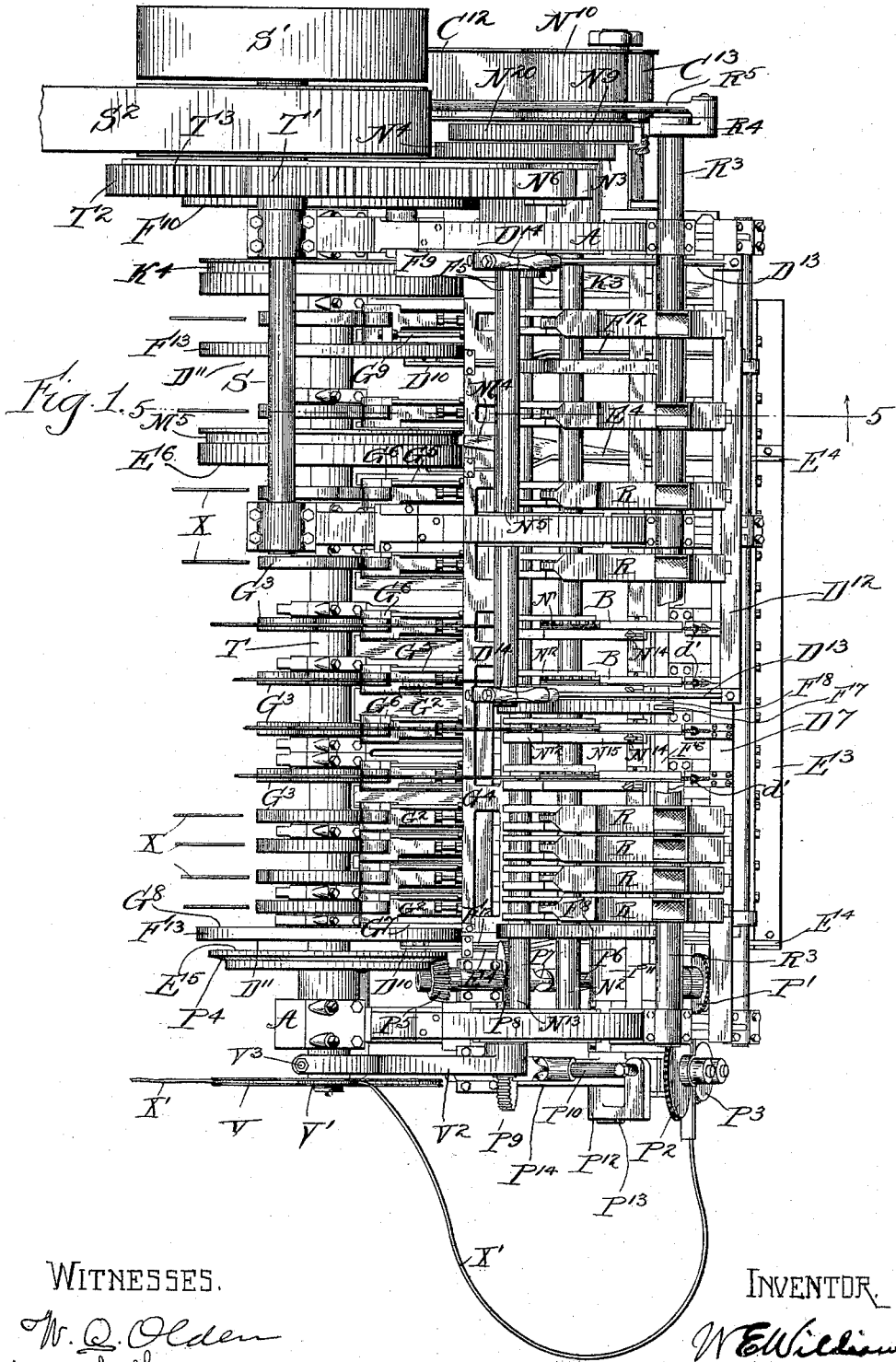

No. 610,217. Patented Sept. 6, 1898.
W. E. WILLIAMS.
MACHINE FOR MAKING WOVEN WIRE FENCING.
(Application filed Dec. 17, 1897.)
(No Model.) 11 Sheets—Sheet 1.

WITNESSES.
W. Q. Olden
Wm. F. Henning

INVENTOR.
W. E. Williams

No. 610,217. Patented Sept. 6, 1898.
W. E. WILLIAMS.
MACHINE FOR MAKING WOVEN WIRE FENCING.
(Application filed Dec. 17, 1897.)
(No Model.) 11 Sheets—Sheet 3.

WITNESSES. INVENTOR.

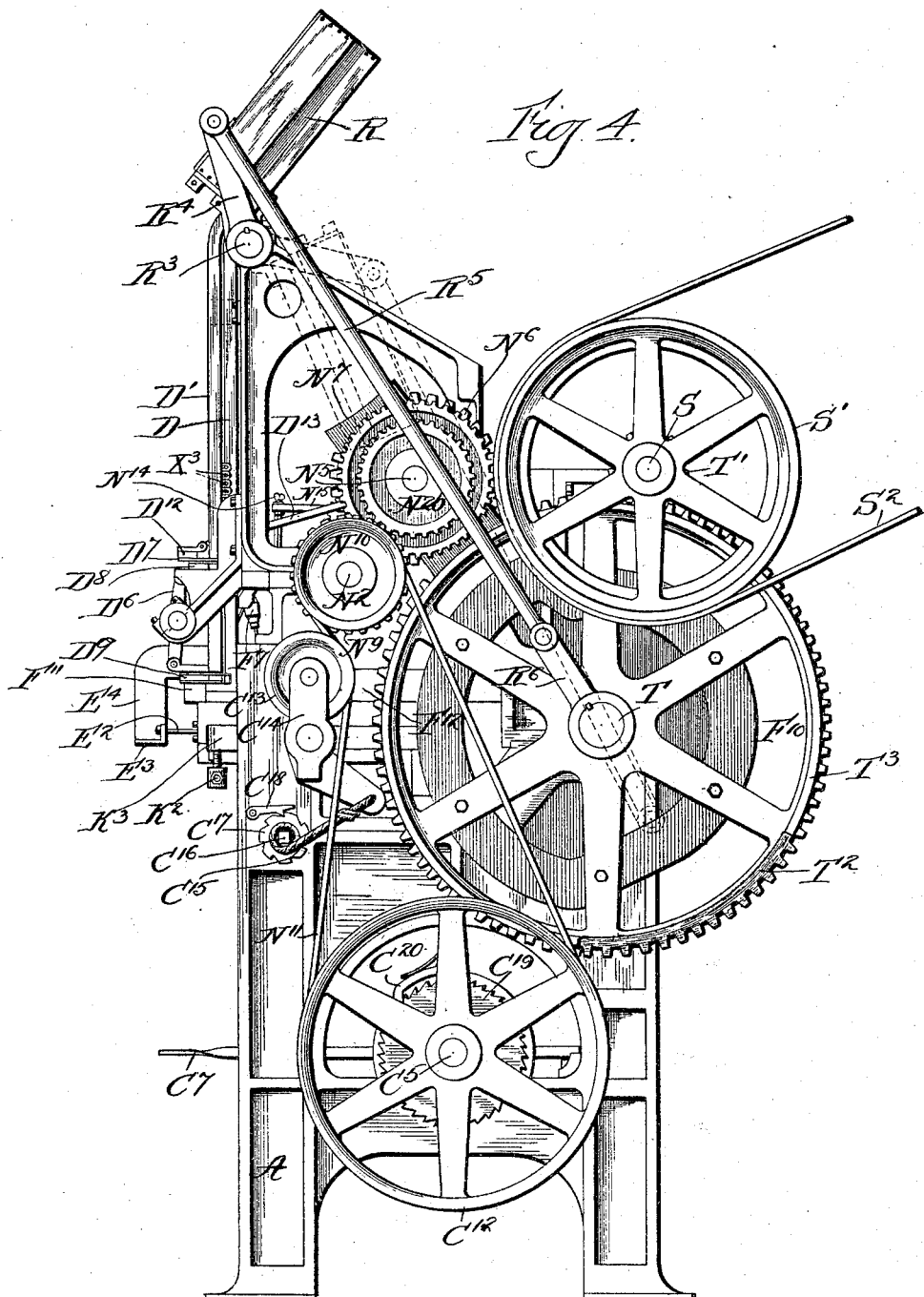

No. 610,217. Patented Sept. 6, 1898.
W. E. WILLIAMS.
MACHINE FOR MAKING WOVEN WIRE FENCING.
(Application filed Dec. 17, 1897.)
(No Model.) 11 Sheets—Sheet 5.
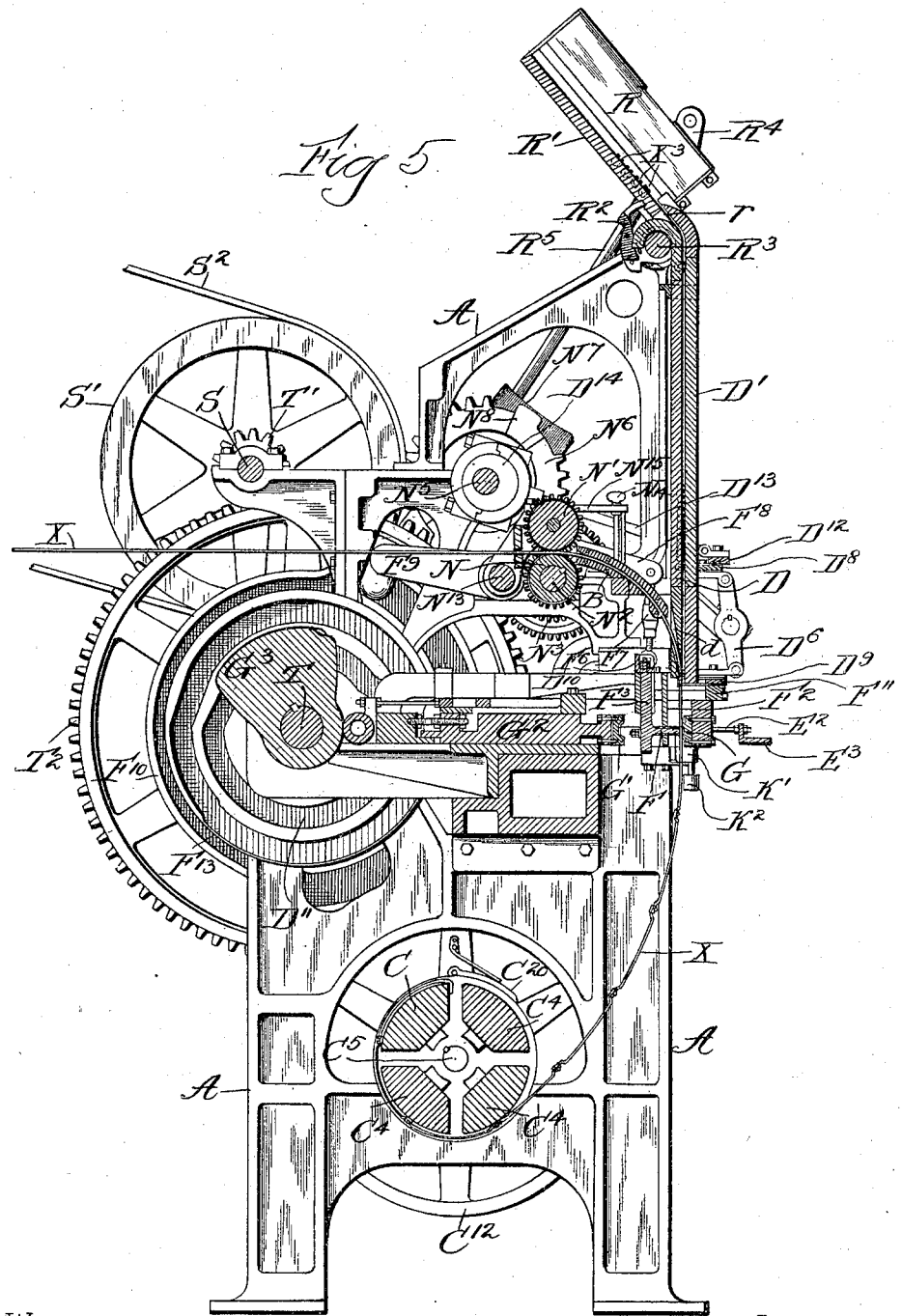

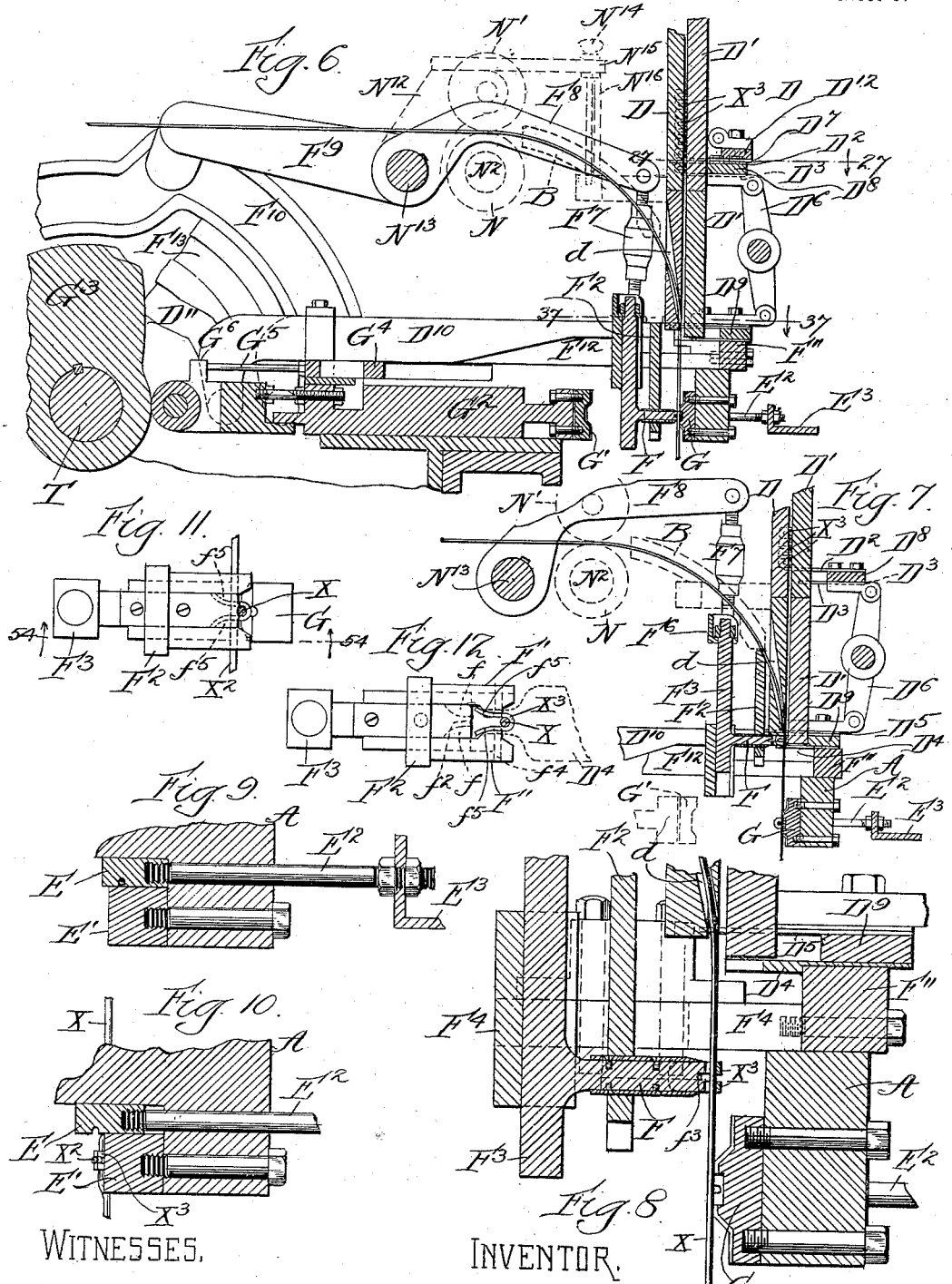

No. 610,217. Patented Sept. 6, 1898.
W. E. WILLIAMS.
MACHINE FOR MAKING WOVEN WIRE FENCING.
(Application filed Dec. 17, 1897.)
(No Model.) 11 Sheets—Sheet 7.
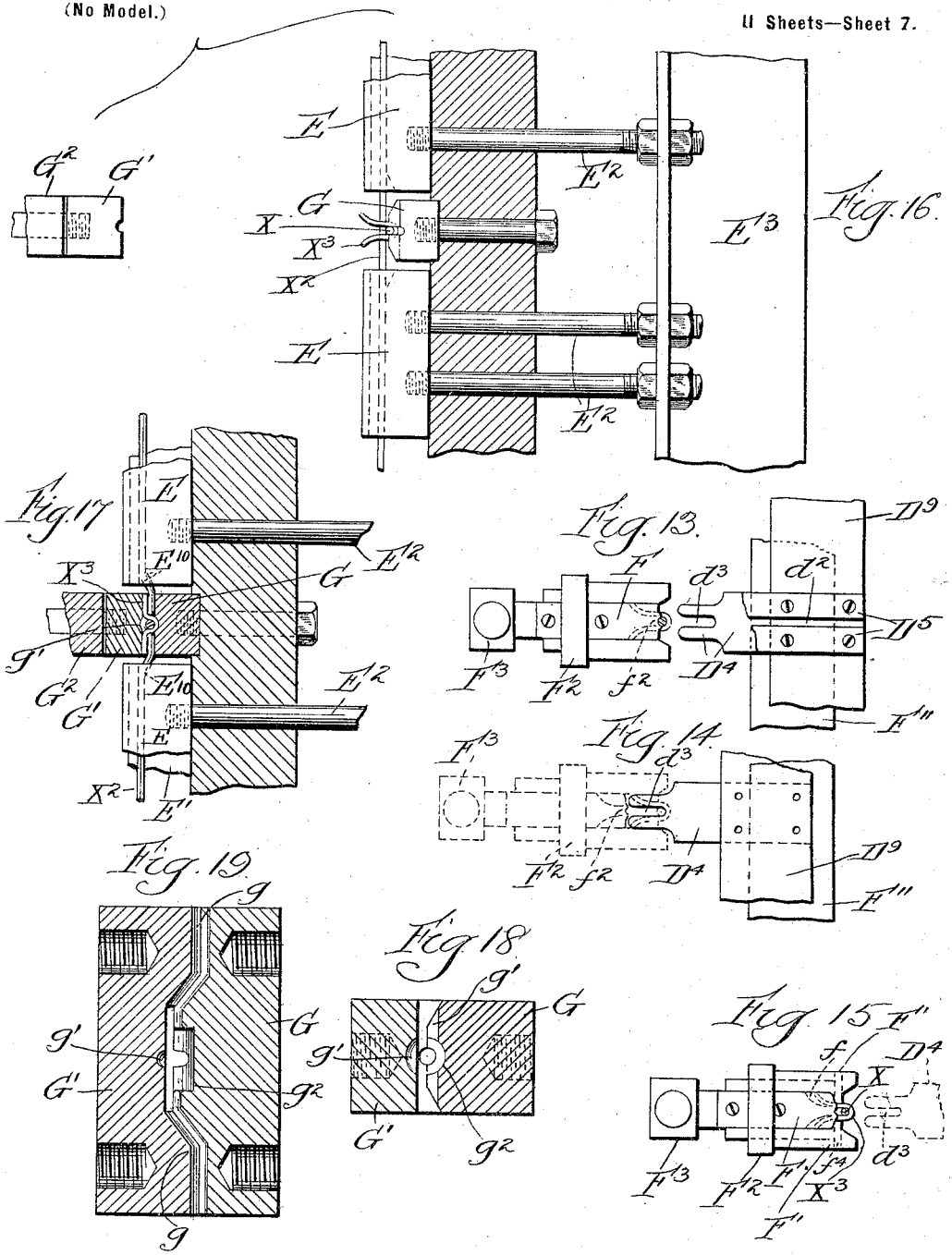
WITNESSES.
INVENTOR,

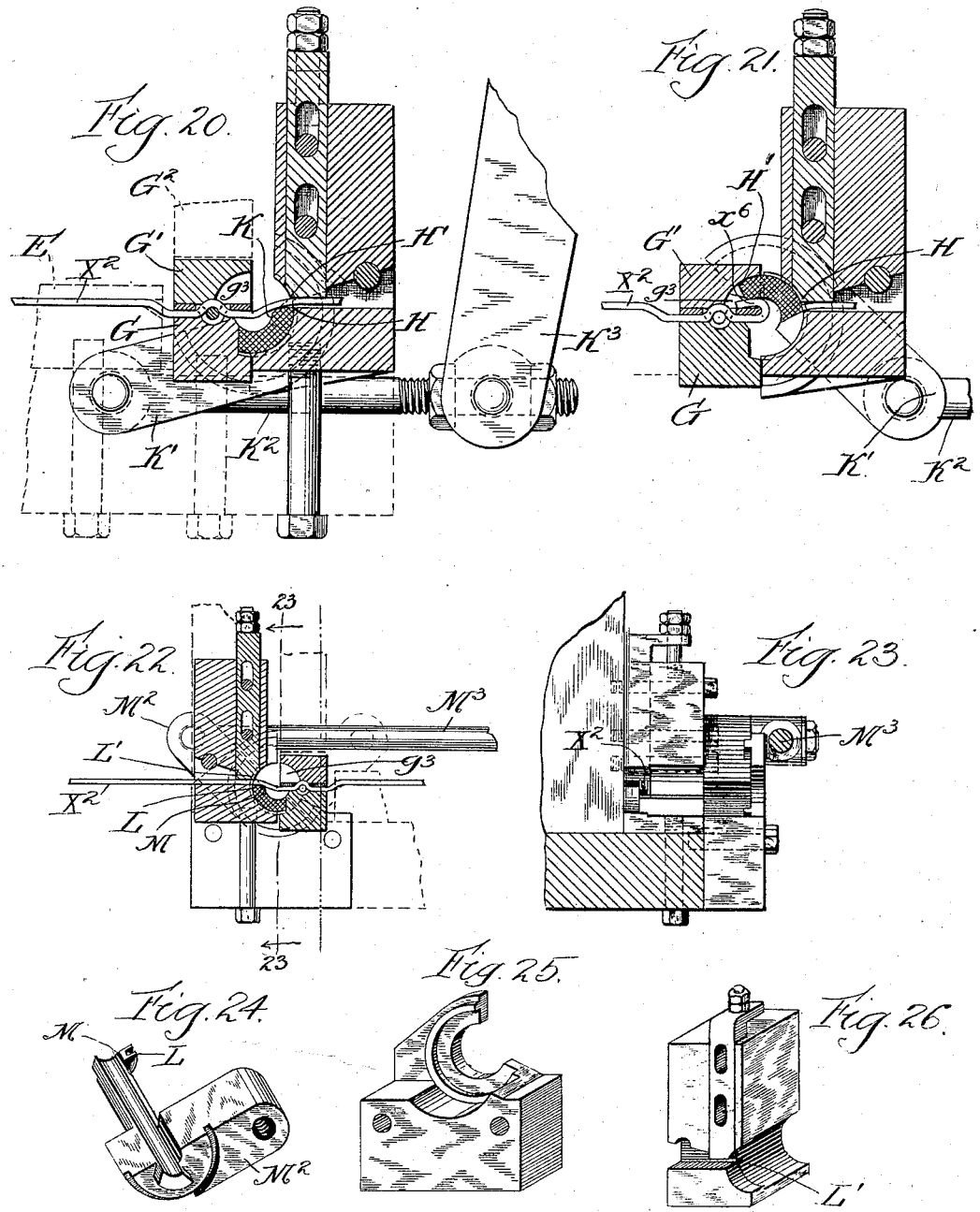

No. 610,217. Patented Sept. 6, 1898.
W. E. WILLIAMS.
MACHINE FOR MAKING WOVEN WIRE FENCING.
(Application filed Dec. 17, 1897.)
(No Model.) 11 Sheets—Sheet 9.
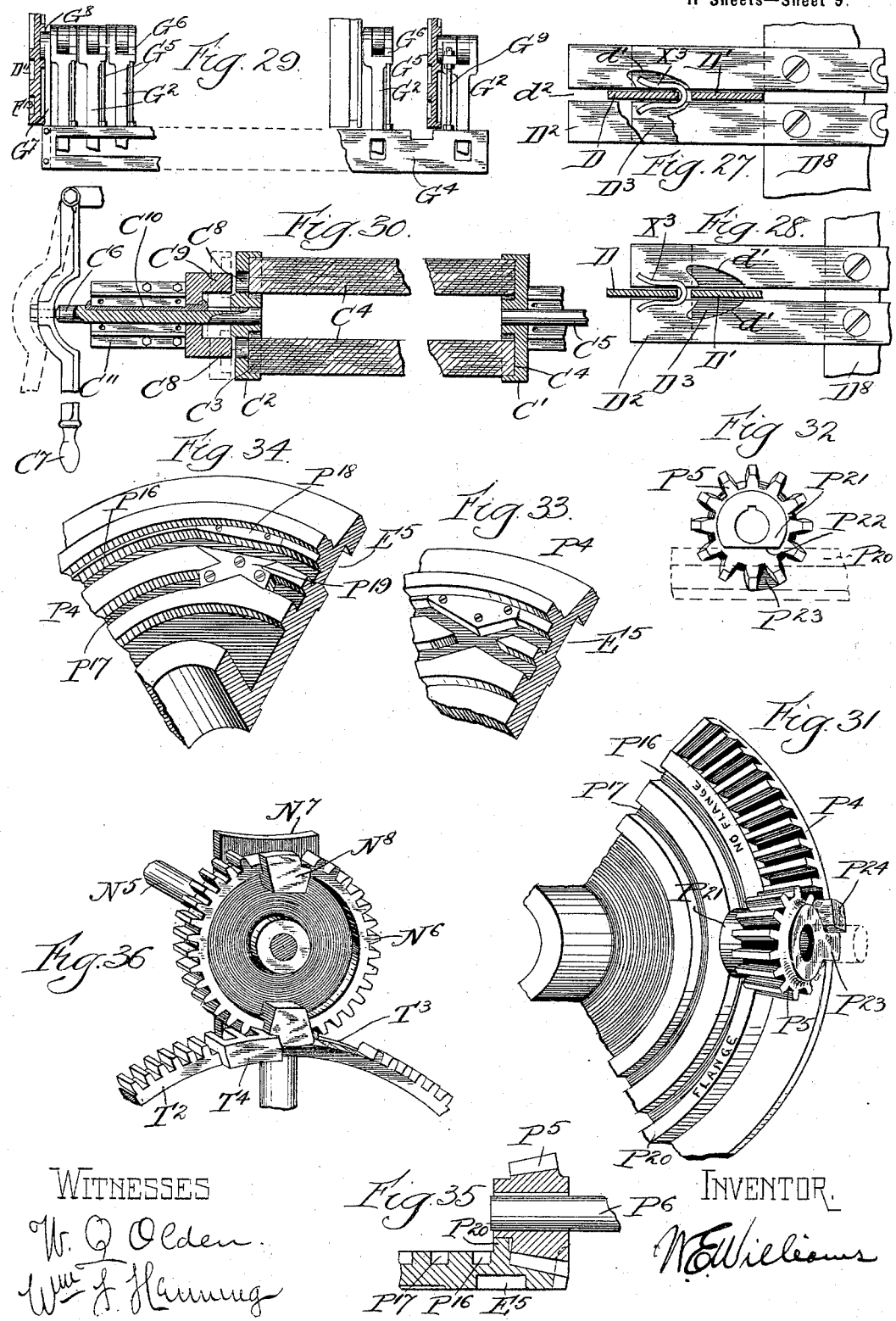
WITNESSES
INVENTOR.

No. 610,217. Patented Sept. 6, 1898.
W. E. WILLIAMS.
MACHINE FOR MAKING WOVEN WIRE FENCING.
(Application filed Dec. 17, 1897.)
(No Model.) 11 Sheets—Sheet 10.
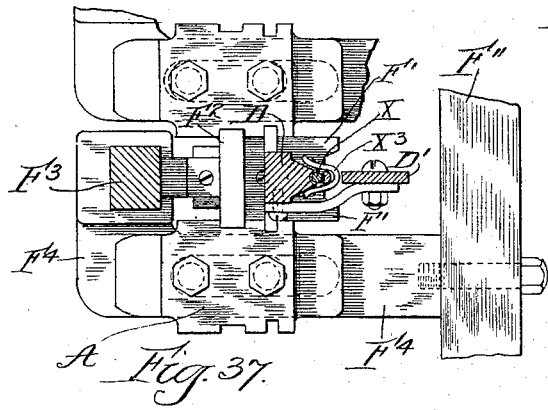
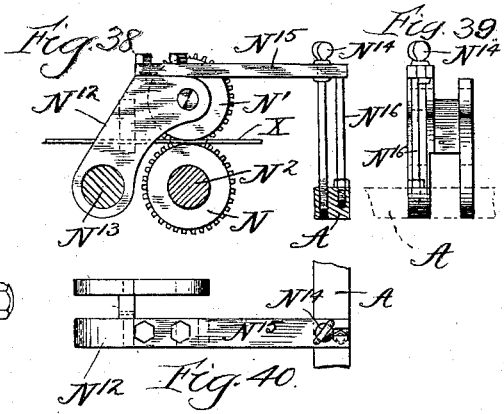
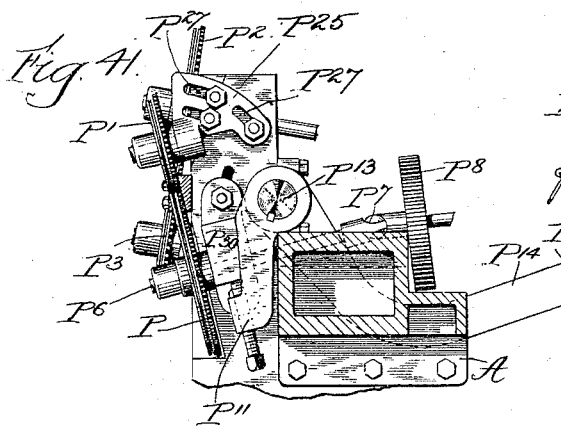
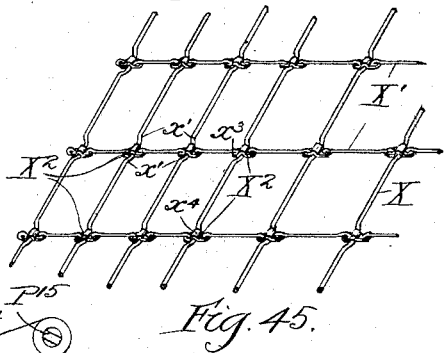
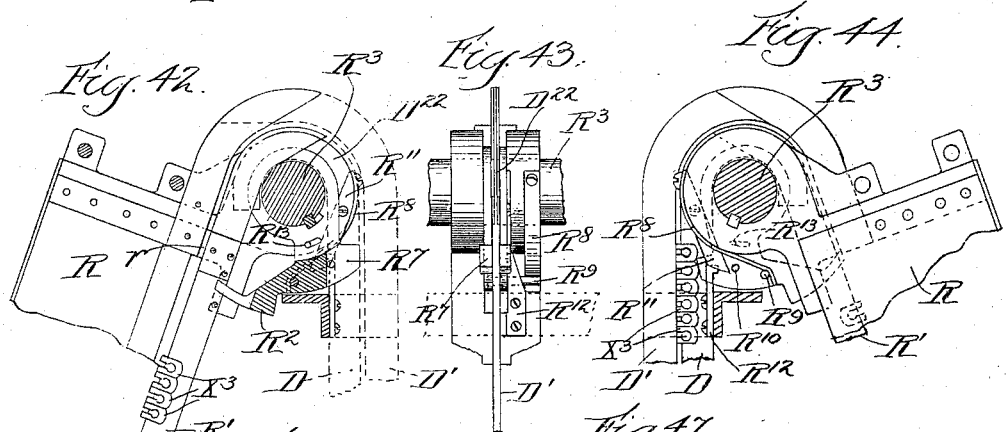
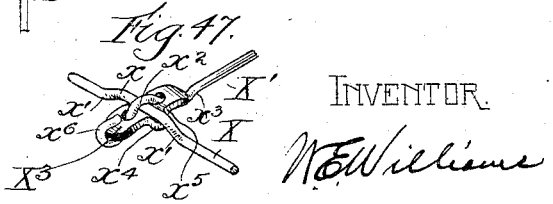
WITNESSES
INVENTOR.

No. 610,217. Patented Sept. 6, 1898.
W. E. WILLIAMS.
MACHINE FOR MAKING WOVEN WIRE FENCING.
(Application filed Dec. 17, 1897.)
(No Model.) 11 Sheets—Sheet 11.
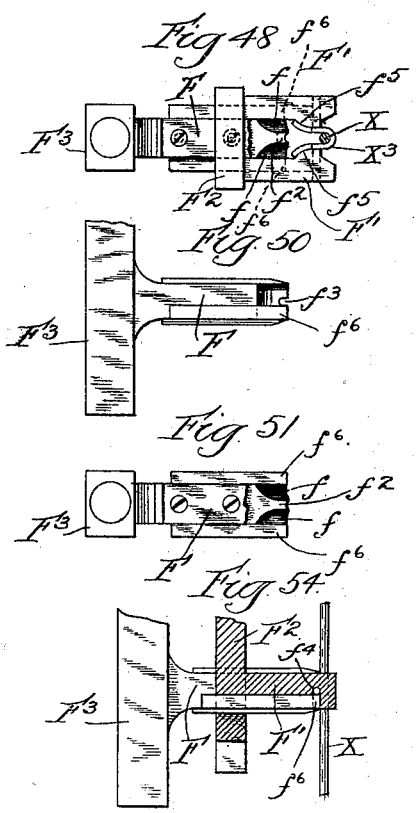
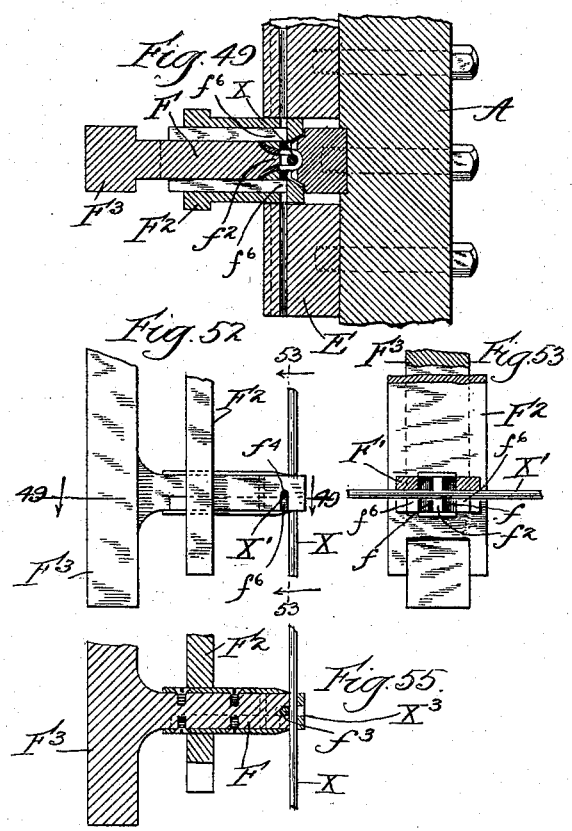
WITNESSES.
W. O. Olden.
Wm. F. Henning.
INVENTOR.
W. E. Williams

UNITED STATES PATENT OFFICE.

WILLIAM ERASTUS WILLIAMS, OF CHICAGO, ILLINOIS, ASSIGNOR TO CORY E. ROBINSON, OF JOLIET, ILLINOIS.

MACHINE FOR MAKING WOVEN-WIRE FENCING.

SPECIFICATION forming part of Letters Patent No. 610,217, dated September 6, 1898.

Application filed December 17, 1897. Serial No. 662,325. (No model.)

*To all whom it may concern:*

Be it known that I, WILLIAM ERASTUS WILLIAMS, a citizen of the United States, residing in Chicago, in the county of Cook and State of Illinois, have invented a new and useful Improvement in Machines for Manufacturing Woven-Wire Fences, of which the following is a specification.

My invention relates to machines for automatically manufacturing woven or stay wire fence composed of a series of longitudinal or fence wires to which are secured at intervals transverse or stay wires.

The object of my invention is to provide a machine of a simple and efficient construction for automatically manufacturing that particular kind of woven or stay wire fence wherein the transverse or stay wires are united to the longitudinal or fence wires at the crossings of the same by slotted metal clips, the transverse or stay wires being threaded through the slotted clips when the clips are astride the fence-wires, and the clips, stay-wires, and strand-wires being all swaged, bent, or crimped into the required form after the parts are assembled. In my invention a guide or passage way for the clips extends tangentially or at an angle to the fence-wire to assemble the clips astride the fence or strand wire for each of the several strand-wires. After the clip is thus assembled astride the fence or strand wire a clip carrier and holder having two movements, one to cause it to embrace the clip and the other to move it into registry with the stay-wire guide, holds the clip in position to receive the stay or transverse wire. The stay or transverse wire is guided through the clips by a sectional two-part guide, one part of which opens from the other to permit the fabric to feed forward and the transverse or stay wires just secured to the strand-wires to be released from said guide. After the clips, stay-wires, and strand-wires are thus assembled the clips, stay-wires, and strand-wires are simultaneously bent or swaged into the required form to rigidly and firmly unite the transverse and strand wires together at the crossings by a pair of opening and closing dies, one pair of dies being employed for each strand or fence wire and the series of pairs of dies operating in succession one after another to enable the wire from which the stay is formed to feed forward the necessary length to compensate for the shortening of the stay by the bends or crimps formed therein by the dies. The free end of the stay-wire is bent around the clip on the marginal strand-wire at one edge of the fence fabric, and the stay-wire is cut off by a pair of knives and the severed end folded or bent around the clip on the marginal strand-wire at this other edge of the fence fabric.

My invention consists in the novel construction and in the novel combinations of parts and devices herein shown and described, and more particularly specified in the claims.

In the accompanying drawings, forming a part of this specification, and in which similar letters of reference indicate like parts throughout all the figures, I have illustrated one good construction of mechanism for reducing my invention to practice, the same being what I believe to be the best construction now known to me.

Figure 2:
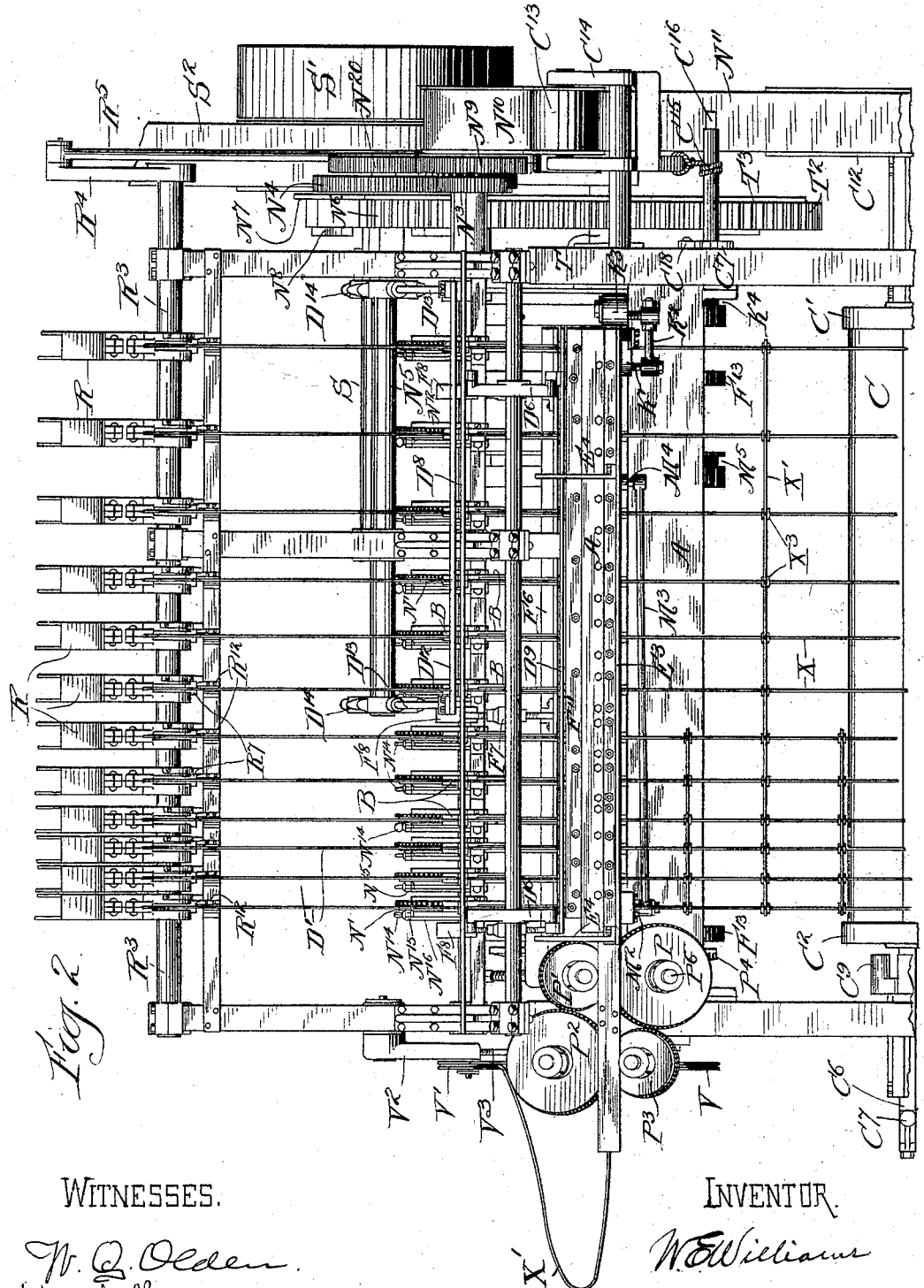
Figure 3:
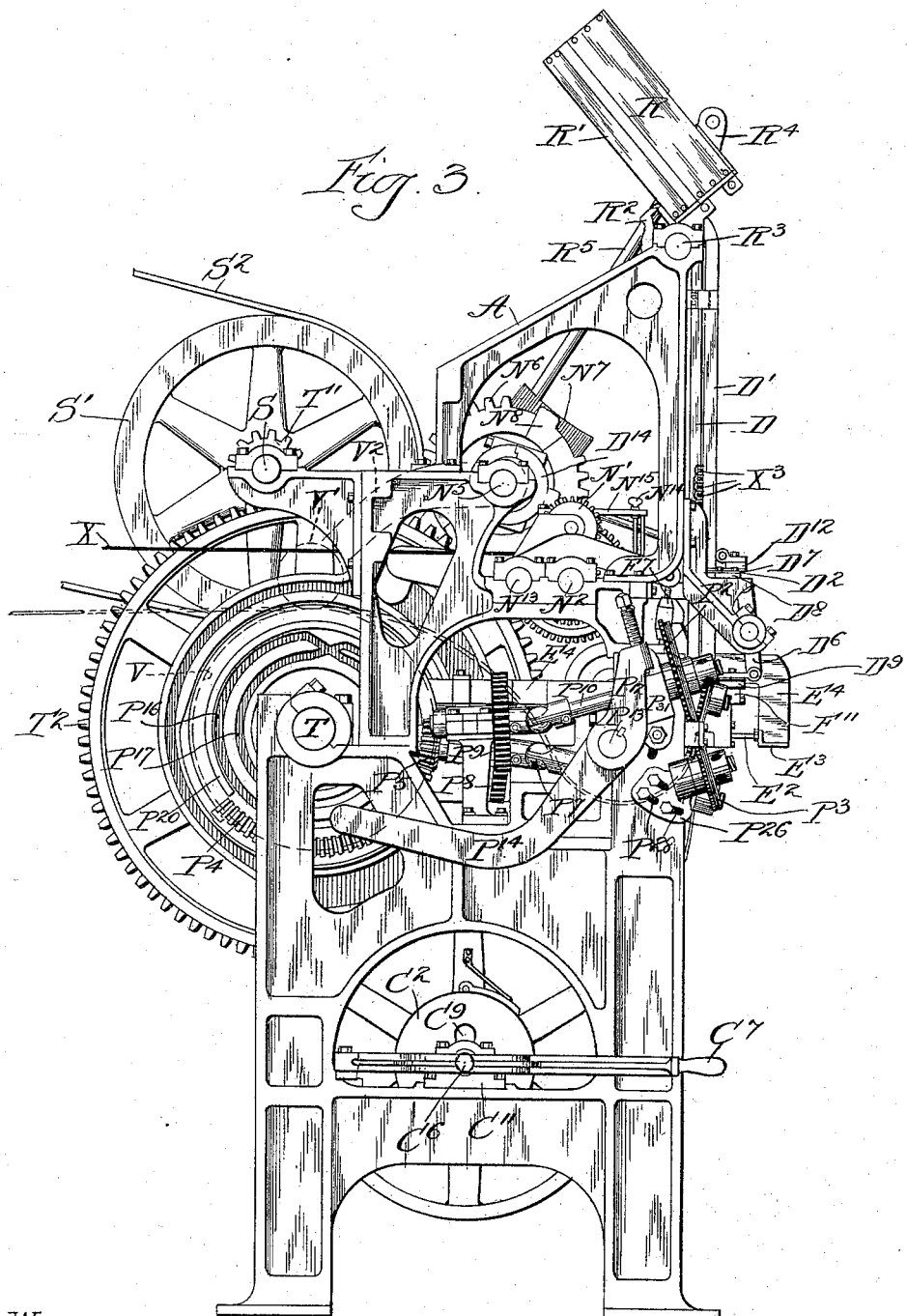

In said drawings, Figure 1 is a plan view. Fig. 2 is a partial front elevation. Fig. 3 is a left-hand end elevation, and Fig. 4 a right-hand end elevation. Fig. 5 is a vertical section on line 5 5 of Fig. 1 looking in the direction indicated by the arrow. Fig. 6 is an enlarged detail vertical section corresponding to Fig. 5. Figs. 7 and 8 are detail vertical sections similar to Fig. 6, showing the parts in different positions. Figs. 9 and 10 are detail vertical sections of the transverse or stay wire guide. Figs. 11, 12, 13, 14, and 15 are detail plan views showing the clip-carrier and other parts. Figs. 16, 17, and 18 are detail horizontal sections showing the dies. Fig. 19 is a vertical section of the dies. Fig. 20 is a detail horizontal section showing the cutters and folding or bending devices for cutting off the surplus from the free end of the stay-wire and bending or folding the end of the stay-wire around the end of the clip on the top marginal strand-wire. Fig. 21 is a sectional view similar to Fig. 20, showing the parts in a different position. Fig. 22 is a horizontal sectional view showing the cutters for cutting the stay from the stay-wire and the folding or bending device for this end of the stay. Fig. 23 is a vertical section on line 23 23 of Fig. 22. Figs. 24, 25, and 26 are detail perspective views of parts shown in Figs. 22 and 23. Figs. 27 and 28 are sections on line 27 27 of Fig. 6, showing the clip-feed gates. Fig. 29 is a detail plan view showing mechanism for returning the punches or movable dies. Fig. 30 is a plan detail sectional view showing the winding drum or reel for the finished fabric or woven or stay wire fence. Figs. 31, 32, 33, 34, and 35 are details of devices connected with the stay-wire-feed device. Fig. 36 is a detail view of the stop motion of strand-wire-feed device. Fig. 37 is a horizontal section on line 37 37 of Fig. 6. Figs. 38, 39, and 40 are detail views of strand-wire-feed-roll-carrying block. Fig. 41 is a detail view showing stay-wire-feed devices, looking to the left frame inside the left-frame leg. Figs. 42, 43, and 44 are detail views showing the mechanism for delivering the clips into the clip-feed chutes or guides. Fig. 45 is a perspective view showing a small portion of the woven or stay wire fence produced by the machine. Fig. 46 is an enlarged detail view of the clip, and Fig. 47 is an enlarged perspective view showing a single joint of the fabric at one of the marginal strand-wires. Figs. 48, 49, 50, 51, 52, 53, 54, and 55 are detail views showing the clip holder and carrier in various positions and sections, as will be readily understood from the letters indicating the parts.

In the drawings, A represents the frame of the machine. This may be of any suitable form or construction adapted to give support to the different parts or devices of the machine.

X represents the strand or fence wires, X' the transverse or stay wires, and $X^2$ the clips in their finished form, and $X^3$ representing the clips in the form in which they are when assembled in the unfinished fabric. Each of the strand-wires at each crossing has a wide bend $x$, forming a shoulder $x'$ on each side of the clip, and each stay-wire at each crossing has a seat $x^2$ for the strand-wire and two reverse bends $x^3$, one as a seat for each end of the clip, and the clip $X^3$ has a middle bend $x^4$ as a seat for the strand-wire and a reverse curve or bend $x^5$ at each end of the clip, and each stay-wire has at each end a fold $x^6$ over the end of each marginal clip to make a secure fastening at the marginal wires of the fabric. The clip $X^3$, as will be seen from Fig. 46, is of a folded or U shape when conveyed to the machine and before it is swaged or bent into its finished form.

My machine for automatically manufacturing the finished fabric (illustrated in Fig. 45) comprises in coöperative combination a series of fence or strand wire guides B for the strand-wires X, a take-up drum or reel C, upon which the finished fabric is wound, a series of clip-feed guides or passages D, extending tangentially or at an angle to the strand-wire guides, a sectional two-part guide E E' for the transverse or stay wire, a series of clip carriers and holders F, a series of pairs of dies G G' for swaging and bending the clips and strand and stay wires, knives or cutters H H' for severing the surplus wire from the free end of the stay, a folder or bending device K for folding or bending the end of the stay-wire about the upper marginal clip of the fabric, knives or cutters L L' for severing the stay from the stay-wire, a folder or bending device M for folding the other end of the stay about the lower marginal clip of the fabric, rolls or feed devices N N' for each of the strand or fence wires, and rolls or feed devices P P' for the transverse or stay wire, and a series of clip-delivery devices R for delivering the clips to the clip-feed passage, chute, or guide.

As the devices for feeding and guiding the strand-wires and the devices for delivering, guiding, carrying, and holding the clips and for swaging or bending the clips, strand-wires, and cross-wires at each crossing are equal in number to the strand-wires and all of the same construction, a description of one set of these devices will answer for the whole series of sets.

The guide B for each of the strand-wires may be of any suitable construction, but consists, preferably, simply of a curved passage for the strand-wire, as indicated in Figs. 5, 6, and 7 of the drawings, and it extends from the strand-wire-feed devices or rolls N N' to the lower end of the clip-feed guide or passage D, where it meets the same tangentially or at an acute angle.

The winding drum or reel C may be of any suitable construction adapted to coöperate with the other parts and to take up or reel up the fence or fabric as fast as it is produced. I, however, prefer to employ a take-up drum or reel of a knockdown construction, so that it can be readily removed from the roll or coil of fabric, and this preferred construction consists, essentially, of a pair of heads C' $C^2$, having recesses $C^3$ to receive the ends of a number, preferably four, of loose bars $C^4$, upon which the fabric is directly wound, as will be readily understood from Fig. 30. The head C' is secured to a driven shaft $C^5$, and the head $C^2$ is secured to a sliding stub-shaft $C^6$, which may be reciprocated by a hand-lever $C^7$ to withdraw the head $C^2$ from the head C' and permit the loose bars $C^4$ to be disengaged from said heads. To insure the certain disengagement of the bars $C^4$ from the head $C^2$, I provide said head $C^2$ with openings $C^8$ and the shaft $C^6$ with a spider or stop $C^9$, the prongs of which are adapted to enter the holes $C^8$ and engage the ends of the bars $C^4$, and thus cause them to be disengaged from the head $C^2$ when the head $C^2$ is withdrawn, as the stop or spider $C^9$ rotates with the shaft $C^6$, but is prevented from reciprocating with said shaft by a feather $C^{10}$, having a shoulder at one end which engages the spider $C^9$ and a shoulder at the other end which engages the box $C^{11}$, in which the shaft $C^6$ is journaled or rotates.

The chute, guide, or passage-way D for feeding the clips and assembling them astride the fence-wire may be of any suitable form or construction. I prefer, however, to employ for this guide a simple bar, astride of which the U-shaped clips $X^3$ may conveniently slide. The guide D is furnished with an adjacent bar D' to keep the clips in place astride the guide D. The guide D is provided with an opening or passage $d$ for the strand-wire to pass tangentially or at an acute angle to the path of the clips, as is clearly illustrated in Figs. 6 and 7. The lower portion of the guide D, in which the guideway or passage $d$ is formed, is preferably enlarged to substantially the cross-section of the interior of the U-shaped clip, as is clearly illustrated in Fig. 37, while the upper portion of the guide D may be a plain flat bar, as indicated in Figs. 27 and 28.

To feed the clips one by one astride the fence-wire and to the clip carrier and holder F, I provide the clip-feed guide with a pair of feed gates or slides $D^2 D^3$, one above the other, operating alternately to close the feed-passage, the feed gates or slides $D^2 D^3$ being located the width of a clip apart and the feed-slide $D^2$ being longer than the slide $D^3$ and provided with an opening $d'$, through which a clip may pass when said opening is in registry with the path of the clips in the guide D. (See Figs. 27 and 28.)

To stop or arrest each clip in proper position on the guide D to be received by the clip carrier and holder F, I provide the clip-feed passage or guide D with a third feed slide or gate $D^4$ at or near the lower end of the guide D and which stop-gate is alternately opened and closed, as required.

A fourth feed slide or gate $D^5$ is provided the width of a clip above the gate or slide $D^4$ for the purpose of forcing the clip to proper position to be received by the clip carrier and holder F in case the clip should not fall to its exact position, and also as an additional security against the feeding of more than one clip at a time. The feed-slides $D^2$, $D^3$, and $D^5$ have a central slot or open space $d^2$ to receive, embrace, or accommodate the clip-guide bars D D', and the lower feed-slide $D^4$ has a central slot or opening $d^3$ to receive or accommodate the strand-wire X, the base of this slot also serving to force the strand-wire against the back edge of the guide hole or passage $d$, and thus insure sufficient space between said strand-wire X and the guide-bar D' for the certain passage of the clip to place. The slotted slide or gate $D^4$ thus prevents all danger of the clip sticking between the strand-wire and said guide-bar D'.

The pair of feed-slides $D^2 D^3$ are operated simultaneously with each other and alternately with the pair of feed gates or slides $D^4$ $D^5$, this being preferably done by securing said pairs of slides to the opposite ends of a common lever $D^6$.

The clip carrier and holder F may be of any suitable construction adapted to receive the clips one by one when arrested on the clip-guide D by the feed slide or gate $D^4$ and carry the same into position for receiving the transverse or stay wire and holding the clips accurately in line with the stay-wire guide while the stay is threaded through the clips. The construction of clip carrier and holder which I prefer to employ in combination with the other parts or devices in practicing my invention is illustrated in the drawings and has essentially two movements, one a lateral or horizontal movement to and from the strand-wire to bring the clip-carrier astride the clip or cause it to engage or embrace the clip while the clip is in position astride the strand-wire and on the feed slide or gate $D^4$; and, second, a vertical movement or movement in the direction of the strand-wire to carry the clip into position for receiving the stay or transverse wire. The clip-carrier F has a forked recess or cavity $ff$ to receive the two limbs of the U-shaped clip, so that the carrier embraces the clip both above and below and also between the limbs of the U-shaped clip. The clip-carrier F is also provided with parts or members F' F', which embrace or engage the clip laterally on the outside of its two limbs. The parts or members F' F' have simply a reciprocating movement in the direction of the strand-wire and no reciprocating movement with the carrier F horitally or at right angles to the direction of the strand-wire, as the clip drops down between the jaws or members F' F'. The central projection, nose, or end $f^2$ of the clip-carrier F is provided with a horizontal shallow curved seat $f^3$, conforming to the stay or transverse wire, and the jaws or members F' F' are each provided with a horizontal bottomless slot or passage $f^4$ for the transverse or stay wire to pass or be threaded through the clip held in the carrier. This guide slot or passage $f^4$ is bottomless to enable the jaws or members F' F' to be freed from the stay by the upward or return movement of said jaws or members after the stay has been threaded through the clips, but is closed during the threading of the stay-wire by the prongs $f^6$ on carrier F. The jaws or members F' F' have interior shoulders $f^5$, that engage the curved or outwardly-separated ends of the two limbs of the U-shaped clip, and thus hold the clip securely in the carrier against movement outward from the carrier. As the jaws F' F' have simply a vertical reciprocating movement and no lateral reciprocating movement with the carrier F, they are secured to or made integral with a guide-bar $F^2$, which is adapted to reciprocate vertically in the frame A or a block secured rigidly thereto, the carrier F reciprocating laterally in the bar or slide $F^2$, while causing said slide and the jaws F' F', carried by it, to move vertically with the carrier F. The carrier F itself is secured to or made integral with the vertically-moving slide $F^3$, which reciprocates in suitable guides on a horizontally-moving slide $F^4$, that reciprocates in suitable guides on the frame of the machine.

The stay-wire guide E may be of any suitable construction adapted to guide or direct the stay-wire through the series of U-shaped clips held in the series of carriers F and which is adapted to coöperate with the other parts, elements, or devices of the machine. The stay-wire guide is a sectional guide made with notches or intervals to receive or accommodate the clip-carriers and the strand-wires and the dies by which the assembled clips, strand-wires, and stay-wires are compressed or bent to their final shape. To enable the sectional guide to properly and accurately direct the stay-wire through the series of slotted clips and at the same time permit it to be afterward disengaged from the stay, I make this guide in two parts or members E E', one movable in respect to the other, the slot or passage of the guide being formed in one part or member of the guide and the other part or member forming simply the bottom or remaining wall of the slot or passage for the stay-wire. This will be readily understood by referring to Figs. 9 and 10. The stationary part E' of the guide is secured to a longitudinal bar constituting part of the frame of the machine, the movable member E of the guide being connected by the bolts $E^2$ to a reciprocating slide $E^3$, by which the part E is moved from its closed position, as illustrated in Fig. 9, to its open position, as illustrated in Fig. 10, thus permitting the stay to be discharged from the two-part guide.

The clip and stay and strand wire swaging or bending dies G G' may be of any suitable kind or construction adapted to give the required or desired configuration to the assembled clips, strand-wires, and stay-wires. The die G, one for each strand-wire, may preferably be a stationary one and secured by suitable means to the stationary frame of the machine. The other die G' may be preferably given its opening and closing movement by a reciprocating slide $G^2$, to which it is attached. Each of the dies G G' is furnished with a vertical die-cavity $g$ to receive and give the proper bends or configuration to the strand-wire, a transverse die-cavity $g'$ to receive and give the proper configuration or bends to the stay-wire, and a central die-cavity $g^2$ to receive and give the proper bends or configuration to the clip; and the dies at the marginal wire are given an additional cavity $g^3$ to permit the folder for the end of the stay-wire to enter. (See Figs. 20, 21, and 22.) The stay-wire guide E also assists in forming the bends in the stay-wire. (See Fig. 17, wherein the guideway $E^{10}$ engages the stay-wire and causes a permanent set therein when the dies are setting the clips and stay-wire.) The series of movable dies G' or the respective slides $G^2$ by which they are carried are closed and operated successively one after another, beginning at the outer one near the free end of the stay-wire, so that the stock taken up by the bends or crimps formed in the stay-wire may be compensated for by the further feeding forward of the stay-wire to the amount required during the successive operation of the dies, as will hereinafter be described in connection with said stay-wire-feed rolls or devices.

The knives or cutters H H' for severing the surplus stock from the free end of the stay-wire preparatory to bending the free end of the stay-wire about the marginal clip of the fabric may be of any suitable construction adapted to perform this function. I, however, prefer to employ for this purpose a stationary knife H and a rotary knife H', coöperating therewith, as the cutter H' may thus be operated by the same means employed to operate the folder K, by which the free end of the stay-wire is folded about the clip. In this way the movable cutter H' is formed by simply providing the folder K with a cutting edge H'. I prefer to provide the machine with cutters H H' for the free end of the stay-wire, as any irregularity in the feed of the stay-wire may be thus compensated for and as I in this way do not require so accurate or exact an operation of the stay-wire-feed devices as would be desirable where the end of the stay-wire is fed against a fixed stop designed to arrest the further feed. The cutters L L' for severing the stay from the stay-wire and the folder M for folding the severed end of the stay about the marginal clip at the other edge of the fabric may preferably be of the same construction as the cutters H H' and folder K, already described.

The feed devices N N' for feeding each of the strand-wires X forward at intervals may preferably consist of an ordinary pair of feed-rolls, as indicated in the drawings.

The feed devices P P', which feed the stay-wire forward at intervals, as required, may likewise be of any suitable kind or construction; but I prefer to employ a pair of feed-rolls, as indicated in the drawings, for this purpose. In order to permit the slight further feed of the stay-wire required to compensate for the stock taken up by the crimps or bends formed in the stay by the dies after the stay has been threaded through the clips by the feed rolls or devices P P', I journal one of these rolls on a movable bearing or box $P^{30}$, so that the pressure, grip, or tension between the two rolls P P' may be slightly relieved or lessened at the time the series of dies G G' begin to act and such grip, pressure, or tension again restored to its normal extent when the stay-wire is required to be fed forward again for the next succeeding stay.

The clip-delivery device R, by which the clips are delivered in proper position to the clip guide or feed passage D, may be of any suitable kind or construction adapted to deliver or present the clips in proper position to said clip guide or feed passage. The device or means, however, which I prefer to employ for this function is illustrated in the drawings, and consists, essentially, of a rocking or vibrating box or magazine for holding the clips in bulk, and which is provided at its bottom with a guide bar or rail R', astride of which the crimps may fit and arrange themselves as the magazine is rocked or tilted back and forth and from which the clips may slide onto the curved end $D^{22}$ of the guide-bar D when the magazine is tilted into its upper inclined position, as illustrated in the drawings in Figs. 3, 4, and 5, the inner or hinged end of the clip-magazine being provided with an opening $r$, conforming in shape to the clip, and through which the clips on the guide R' may pass to the guide-bar D.

In order to prevent the clips from being delivered from the magazine R to the clip-guide D when the latter is full, and thus prevent danger of clogging or wedging the clip passage or way, I provide the magazine or clip-delivery device R with a movable gate $R^2$, which cuts off the further delivery of clips and which gate or slide is automatically closed when the clip-guide D is full of clips.

As illustrated in the drawings, Fig. 2, the fence or fabric produced by the machine is shown as being provided with alternate long and short stays in order that the lower strands of the fence, which are closer together and intended to obstruct the passage of small animals, may be properly stayed in position at shorter intervals than the upper wires. To adapt my machine to produce the fence with alternate short stays when desired or required, I provide the clip-feed guide or passage D with a supplemental feed gate or slide $D^7$, which slide is alternately opened and closed, so as to permit the feed of the clip when the alternate long stay is fed across the strand-wires and to shut off the feed of the clip when the short stay is fed. The supplemental feed slides or gates $D^7$ of course are only provided on those clip-guides which it may be desired to close or shut alternately. The supplemental feed slides or gates $D^7$ are secured to and operated by a reciprocating bar $D^{12}$. For this same purpose I provide the stay-wire-feed rolls or devices P P' with a supplemental pair of feed-rolls $P^2$ $P^3$, which may alternately grip or engage the stay-wire and feed it the distance required for a short stay, and with devices for causing each pair of stay-wire-feed rolls to alternately grip the stay-wire, as required.

Any suitable connecting mechanism or gearing may be employed for communicating to the various moving elements, parts, or devices of the machine the required movements, directly or indirectly, from the main driving-shaft S of the machine. In the drawings I have illustrated the connecting mechanism or gearing which I prefer to employ for such purposes, and I will now proceed to describe the same.

The driving-shaft S is journaled in suitable boxes on the frame of the machine and provided with a driving-pulley S', to which power is communicated through the belt $S^2$. The power is communicated from the driving-shaft S to the cam-shaft T through gears T' $T^2$.

The driven feed-rolls N of each pair of rolls N N' are all secured to a common shaft $N^2$, which is given an intermittent and rotary movement to feed the strand-wires forward the required distance at intervals by means of a gear $N^3$, (see Figs. 1 and 5,) meshing with a gear $N^4$ on a counter-shaft $N^5$, which is provided with a mutilated gear $N^6$, that meshes with the gear $T^2$ on the cam-shaft T, the gear $T^2$ being provided with a flange $T^3$ and a big tooth $T^4$. The mutilated gear is provided with two stop-blocks $M^7$ and two big teeth $N^8$, and at the point where the big tooth is located the teeth are absent in the mutilated gear. The flange $T^3$ of the big gear $T^2$ is absent for a sufficient space to provide for the travel of the block $N^7$ of the mutilated gear. The big tooth $T^4$ engages the big tooth $N^8$ and starts the mutilated gear $N^6$ to moving until the teeth of the mutilated gear engage the regular teeth of gear $T^2$, the flange $T^3$ being absent at this point on the periphery. When the mutilated gear $N^6$ has revolved a half a revolution, the block $N^7$ engages the flange $T^3$ and arrests the further movement of the mutilated gear until the big tooth $T^4$ has completed another revolution.

To enable the machine to readily be changed so as to space the stay-wires at greater distance apart, I provide the feed-roll shaft $N^2$ and the counter-shaft $N^5$ with supplemental gears $N^{20}$ $N^9$ of different diameters from the gears $N^3$ $N^4$, and by simply fixing one or the other set of these gears on their shafts at the time the extent of feed of the strand-wires may be varied and the consequent spacing of the stays.

The take-up drum C or its shaft $C^5$ is driven from the feed-roll shaft $N^2$ by a pulley $N^{10}$ thereon and a belt $N^{11}$, which passes around a pulley $C^{12}$ on drum-shaft $C^5$. A belt-tightener pulley $C^{13}$, mounted on a bent lever $C^{14}$, is held against the belt by a cord $C^{15}$ on a windlass $C^{16}$, which is furnished with a ratchet $C^{17}$ and pawl $C^{18}$. The tension of the belt is adjusted so that the pulley on the take-up drum may slip, and thus cause the drum to rotate only to the extent required for taking up the fabric as it is produced. The pulley $C^{12}$ is loose on the shaft $C^5$ and is connected therewith through a ratchet $C^{19}$, fast on the shaft, and a pawl $C^{20}$, mounted on the pulley, engages the ratchet, so that the drum can be turned without slipping the belt N' when required to take up the slack in the fabric.

The upper roll N' of each pair of feed-rolls N N' is mounted on a swinging arm $N^{12}$, pivoted on a shaft $N^{13}$, and the roll $N'$ is pressed against its mate N to cause the requisite grip or friction on the wire by a thumb-screw $N^{14}$, passing through the spring extension $N^{15}$ of the arm $N^{12}$ and which enters a frame-bar A. A stop-pin $N^{16}$ serves to preserve the adjustment of the thumb-screw when it is loosened for inserting a new wire.

The clip-carrier F or its slide $F^3$ is given its vertical reciprocating movement by means of a reciprocating bar $F^6$, to which all of the carrier-slides $F^3$ are secured, and which bar is moved up and down by links $F^7$, connecting the bar with arms $F^8$ on the rock-shaft $N^{13}$, which is provided with an arm $F^9$, that engages a cam $F^{10}$ on the cam-shaft T or on the gear $T^2$, fast on said cam-shaft. The horizontal reciprocating movement is communicated to the carrier F or to its horizontal moving slide $F^4$ by means of a reciprocating bar $F^{11}$, to which each of the slides $F^4$ is connected, and which bar $F^{11}$ is moved back and forth by connecting-bars $F^{12}$ $F^{12}$, which engage cams $F^{13}$ $F^{13}$ on the cam-shaft T, there being two of these cams $F^{13}$ and two of the connecting-bars $F^{12}$, one near each end of the bar $F^{11}$.

The vibrating lever $D^6$, by which two pairs of clip-feed gates or slides $D^2$ $D^3$ and $D^4$ $D^5$ are operated, is vibrated by a connecting link or bar $D^{10}$, which engages a cam $D^{11}$ on the cam-shaft T, a link $D^{10}$ and cam $D^{11}$ being duplicated at each end of the machine, and the series of pairs of feed-slides $D^3$ $D^4$ being all connected together by a bar $D^8$, and the several pairs of feed-slides $D^4$ $D^5$ being connected together by a bar $D^9$.

The supplemental clip-feed slide $D^7$ is operated, as required to alternately open and close the clip-feed passage, by a reciprocating bar $D^{12}$, to which all of said supplemental slides are secured, and which bar is operated by links $D^{13}$, connected to eccentrics $D^{14}$ on the counter-shaft $N^5$.

The movable member E of the stay-wire guide or the reciprocating bar $E^3$ to which they are all secured is operated by two cam-arms $E^4$ $E^4$, which engage a cam $E^5$ on the mutilated gear $P^4$ and a similar cam $E^6$.

The movable dies $G'$ or the reciprocating slides $G^2$ to which they are connected are operated successively one after another in their forward or closing movement by a series of cams $G^3$ on the cam-shaft T, and they are returned simultaneously by a bar $G^4$, provided with stops $G^5$, which engage projections $G^6$ on the slides $G^2$, and the bar $G^4$ is moved at one end by the block $G^7$, driven by a cam $G^8$, and at the other end the bar $G^4$ is connected by the bolt $G^9$ to the slide $G^2$ at that end. Thus the bar $G^4$ is moved forward its entire distance simultaneously with the forward movement of the first slide $G^2$ in the slide which carries the die for the outer strand-wire. The several other slides are driven forward the larger portion of their movement simultaneously by the several cams $G^3$; but each cam is offset at its finishing-point to cause the several slides to go forward to set the clips successively from the outer end of the stay-wire down to the inner or lower strand-wire. Thus each slide $G^2$ is brought up simultaneously to bring the dies in contact with the clips bent to shape them, the shaping being done successively, as described, and this arrangement of the bar $G^4$ permits this successive movement of the slide $G^2$. The folder K, and with it the movable cutter $H'$, is given its rotary movement by the arm $K'$, connected by link $K^2$ to lever $K^3$, pivoted in the frame of the machine (see Fig. 1) and actuated by cam $K^4$ on shaft T. This cam is designed and made to actuate the folder K at the instant that the dies have completed the setting of the clip. Thus the clip is held while the end of the stay-wire is threaded thereon. The folder M, with its cutter $L'$, is actuated by the lever $M^2$, connected by the rod $M^3$ to a lever $M^4$, (see Fig. 1,) pivoted in the frame of the machine and actuated by the cam-track $M^5$ in cam $E^6$, and this movement of the folder M also takes place at the time the die at this end has completed the setting of the clips, and the movement of the folder M, carrying its cutting edge L, severs the stay-wire at the same time.

The feed-rolls $P'$ $P^3$ for the stay-wire are driven by the mutilated gear $P^4$, mounted on shaft T and engaging the beveled pinion $P^5$ on shaft $P^6$ of feed-roll P. A universal joint $P^7$ connects the two parts of this shaft to permit different sizes of feed-rolls P to be mounted upon the shaft for different lengths of stay-wires desired to be used. A gear $P^8$, engaging a gear $P^9$ on the shaft $P^{10}$, drives the stay-wire-feed roll $P^2$. This shaft $P^{10}$ is also provided with a universal joint for the same purposes as that of the shaft $P^6$. The feed-rolls P and $P^2$ are pressed into engagement with the stay-wires alternately by arms $P^{11}$ and $P^{12}$ on a shaft $P^{13}$, which is rocked or oscillated by an arm $P^{14}$, having a butterfly $P^{15}$ engaging cam-tracks $P^{16}$ and $P^{17}$ in the web of mutilated gear $P^4$. The character of these tracks $P^{16}$ and $P^{17}$ is such that at one interval of the actuation of the feed-rolls the feed-roll P is made to engage and drive the stay-wire, while the other roll $P^2$ runs idle and slightly free from engagement from the stay-wire, and at the next interval the roll P runs idle, while the roll $P^2$ drives the wire. The roll $P^2$ is designed to be of sufficient diameter only to drive the stay-wire for the short stay and the roll P of such a diameter to drive the stay-wire for the long stay. The cam-tracks $P^{16}$ and $P^{17}$ are shown to cross each other in Fig. 33, and the character of the butterfly is such that it will travel across the slot of one cam-track alternately at each revolution, and thus during one revolution of the shaft T the arm $P^{14}$ is pressed downward in the outer cam-track $P^{16}$, and during the next revolution it travels the inner track $P^{17}$, causing the feed-rolls P $P^2$ to engage the feed-rolls as described. In the event that the stay-wires are to be of uniform length in the fence some auxiliary blocks $P^{18}$ and $P^{19}$ (see Fig. 34) are placed in the web of the gear $P^4$, which changes the form of the outer cam-track $P^{16}$ and causes the butterfly $P^{15}$ to travel continuously in the outer cam-track, and thus causes the feed-roll P only to engage the stay-wire.

During the interval that the dies are setting clips the cam-tracks $P^{16}$ and $P^{17}$ are so shaped as to cause the arm $P^{14}$ to release both sets of stay-wire-feed rolls to permit the stay-wire to be drawn through them by the shortening of the wire caused by the bending which takes place in fixing it upon the strand-wire. The pinion $P^5$, which drives shaft $P^6$, is driven by the mutilated gear intermittently during that portion of the travel of the gear which is provided with teeth, and it is held in exact position ready to be engaged by a projection $P^{24}$ on the gear $P^4$ by a flat side $P^{22}$ on projection $P^{24}$ of pinion, which engages a flange $P^{20}$ on the gear $P^4$. This flange is absent on that part of the periphery of the gear which is provided with teeth. Hence the pinion is permitted to travel at this part of the periphery. The teeth of the pinion are made to exactly engage the teeth of the gear on starting by means of a big tooth $P^{23}$ on the pinion engaged by a big tooth $P^{24}$ on the gear, Fig. 31. These teeth are located outside of the lines of the regular teeth of the pinion in the gear, and hence may be made to engage squarely at the moment of contact, and thus insure that the other teeth will properly engage each other on coming together.

The rolls $P'$ and $P^3$, which coact with rolls P and $P^2$ in driving the stay-wire, are mounted in blocks $P^{25}$ and $P^{26}$, adjustably fixed to the frame by the bolts and slots $P^{27}$ and $P^{28}$. This adjustment is provided for the purpose of permitting the rolls $P'$ and $P^3$ to be adjusted in the same plane with the rolls P and $P^2$, as in changing the diameter of rolls $P'$ $P^2$ a different plane is necessarily given to them, since the stay-wire remains always at the same line or in line with the guide E.

The stay-wire is fed a considerable distance very quickly and at very short intervals, and to prevent too sudden a strain upon the reel or supporting device for the coil of stay-wire I provide a set of auxiliary feed-rolls V V' for the stay-wire, which operate to draw forward continuously the stay-wire from the coil and furnish it slack to be drawn forward by the regular stay-wire-feed rolls. The feed-roll V is mounted upon the shaft T (see Figs. 1 and 2) and driven thereby, and the feed-roll V' is mounted upon an arm $V^2$, pivoted in the frame of the machine, and is adjusted to tighten the roll V upon the wire by the belt $V^3$. The magazines R are fixed to and supported by the shaft $R^3$, journaled in the frame, and vibrated or oscillated by the arm $R^4$, connected to the link $R^5$, connected to the arm $R^6$, fixed on the shaft T. Thus the magazines are lifted from the position of the dotted lines in Fig. 4 to the position in full lines in said figure, causing the clips to fall by gravity from one end of the magazine to the other, and in this tumbling movement a sufficient number of them will get astride of the bar $R'$ and slide outward and down onto the clip-guide D. When the clip-guide D is full, the exit $r$ for the clips in the magazine is shut off by the stop or gate $R^2$, which is made of peculiar shape and is supported on the shaft $R^3$ and has a projection $R^7$ adapted to be engaged by the clips when the clip-guide is full. The gate $R^2$ is held normally open by the spring $R^8$ engaging the pin $R^9$, fixed in the gate, and a stop $R^{10}$ is provided in the said gate and adapted to be engaged by a spring $R^{11}$, by which the gate $R^2$ is held closed (see Fig. 44) against the action of the spring $R^8$. A stop $R^{12}$ is fixed to the frame and is so shaped that at each time the magazine is lowered to the position of the dotted lines in Fig. 4 it presses outward the spring $R^{11}$ a sufficient distance to release the stop $R^{10}$ of the gate $R^2$, and if no clips are in the guides at this time to engage the projection $R^7$ of the gate the spring $R^8$ will then actuate the gate to open the passage-way $r$ of the magazine. It will be noticed in Fig. 44 that in the positions shown of the stop $R^{10}$ and spring $R^{11}$ there is a little space between them in this view. This permits a sufficient movement of the magazine to give time for the stop $R^{12}$ to be released from engagement with the spring $R^{11}$ and permit the spring $R^{11}$ to engage the stop $R^{10}$ before the gate $R^2$ has moved away from engagement with the clips in the guide. A stop $R^{13}$ (see Fig. 42) limits the movement of the gate $R^2$ under the influence of the spring $R^8$. Thus in the position of this figure the gate is held normally open at all times save only when the clip-guide is full, and then the gate $R^2$ is held in the position of Fig. 44, as above described.

While the machine herein shown and described is specially designed for making the particular construction of stay-wire fence illustrated in Figs. 45 and 47, it will be understood by those skilled in the art that my invention may be used for manufacturing any other construction of woven-wire fence or other fabric wherein the wires are secured together at their crossings by metal clips.

I claim—

1. In a machine for manufacturing woven or stay wire fence, having the cross or stay wires secured to the strand-wires by metal clips through which the stay-wires are threaded, the combination with a series of guides for a series of fence or strand wires, with a series of guides for the clips, a series of sets of gates or slides for opening and closing the clip-guides and feeding the clips one by one therefrom, a series of clip carriers and holders for moving the clips into position for receiving the stay-wire and holding them with their openings through which the stay-wire is to be threaded accurately in line with each other, a sectional two-part opening and closing guide for the stay-wire to direct it through the openings in the series of clips, a series of pairs of dies for swaging, bending or crimping the strand-wires, clips and stay-wire, a pair of cutters or knives for cutting the surplus stock from the free end of the stay, a folder for bending the free end of the stay about the marginal clip at one edge of the fence or fabric, a pair of cutters or knives for severing the stay from the stay-wire, a folder for bending the severed end of the stay about the marginal clip at the other edge of the fence or fabric, a feed device for the stay-wire, a series of feed devices for the strand-wires, a take-up drum or reel, a series of magazines in which the clips are held in bulk each provided with devices for arranging and delivering the clips in position to enter the clip-guide, substantially as specified.

2. The combination with a series of guides for the strand-wires, of a series of guides for the clips, a series of clip carriers and holders, and a sectional two-part opening and closing guide for the stay-wire to thread or direct it through the clips, substantially as specified.

3. The combination with a series of guides for the strand-wire, of a series of clip-holders, and a sectional two-part opening and closing guide for the stay-wire, substantially as specified.

4. The combination with a series of devices for holding a series of clips in line with each other astride a series of strand-wires, of an opening and closing sectional two-part guide for directing the stay-wire through the clips, substantially as specified.

5. The combination with a series of devices for holding a series of clips in line with each other astride a series of strand-wires, of an opening and closing sectional two-part guide for directing the stay-wire through the clips, and feed devices for the stay-wire, substantially as specified.

6. The combination with a series of devices for holding a series of clips in line with each other astride a series of strand-wires, of an opening and closing sectional two-part guide for directing the stay-wire through the clips, and a series of devices for feeding the strand-wires, substantially as specified.

7. The combination with a series of devices for holding a series of clips in line with each other astride a series of strand-wires, of an opening and closing sectional two-part guide for directing the stay-wire through the clips, feed devices for the stay-wire, and a series of devices for feeding the strand-wires, substantially as specified.

8. The combination with a series of guides for the strand-wire of a series of clip-holders, a sectional two-part guide for the stay-wire, and a series of pairs of dies for setting the clips rigidly in position, substantially as specified.

9. The combination with a series of guides for the strand-wire, of a series of clip-holders, a sectional two-part opening and closing guide for the stay-wire, and a stay-wire-feed device, substantially as specified.

10. The combination with a series of guides for the strand-wire, of a series of clip-holders, a sectional two-part opening and closing guide for the stay-wire, and a series of devices for feeding the strand-wires, substantially as specified.

11. The combination with a series of guides for the strand-wire, of a series of clip-holders, a sectional two-part opening and closing guide for the stay-wire, a stay-wire-feed device, and a series of devices for feeding the strand-wires, substantially as specified.

12. The combination with a series of strand-wire guides, of a series of clip-guides extending each tangentially or at an acute angle to the strand-wire guides, whereby the clips are assembled astride the fence-wires, substantially as specified.

13. The combination with a strand-wire guide, of a clip-guide extending tangentially thereto to feed the clip astride the strand-wire, substantially as specified.

14. The combination with a strand-wire guide, of a clip-guide extending tangentially thereto to feed the clip astride the strand-wire, and feed gates or slides to feed the clips one by one, substantially as specified.

15. The combination with a strand-wire guide, of a clip-guide extending tangentially thereto to feed the clip astride the strand-wire, feed gates or slides to feed the clips one by one, and a stop gate or slide to arrest the clip in position, substantially as specified.

16. The combination with a strand-wire guide, of a clip-guide extending tangentially thereto to feed the clip astride the strand-wire, feed gates or slides to feed the clips one by one, a stop gate or slide to arrest the clip in position, and a clip carrier and holder, substantially as specified.

17. The combination with a series of strand-wire guides, of a series of clip-guides extending each tangentially or at an acute angle to the strand-wire guides, whereby the clips are assembled astride the fence-wires, and a series of feed gates or slides for feeding the clips one by one from each of said clip-guides, substantially as specified.

18. The combination with a series of strand-wire guides, of a series of clip-guides extending each tangentially or at an acute angle to the strand-wire guides, whereby the clips are assembled astride the fence-wires, a series of feed gates or slides for feeding the clips one by one from each of said clip-guides, and a series of stop gates or slides for arresting the clips, substantially as specified.

19. The combination with a series of strand-wire guides, of a series of clip-guides extending each tangentially or at an acute angle to the strand-wire guides, whereby the clips are assembled astride the fence-wires, a series of feed gates or slides for feeding the clips one by one from each of said clip-guides, a series of stop gates or slides for arresting the clips, and a series of clip carriers and holders, substantially as specified.

20. The combination with a series of strand-wire guides, of a series of clip-guides extending each tangentially or at an acute angle to the strand-wire guides, whereby the clips are assembled astride the fence-wires, a series of feed gates or slides for feeding the clips one by one from each of said clip-guides, a series of stop gates or slides for arresting the clips, a series of clip carriers and holders, and a sectional opening and closing two-part stay-wire guide, substantially as specified.

21. The combination with a series of strand-wire guides, of a series of clip-guides extending each tangentially or at an acute angle to the strand-wire guides, whereby the clips are assembled astride the fence-wires, a series of feed gates or slides for feeding the clips one by one from each of said clip-guides, a series of stop gates or slides for arresting the clips, a series of clip carriers and holders, a sectional opening and closing two-part stay-wire guide, and a series of pairs of dies, substantially as specified.

22. The combination with a series of strand-wire guides, of a series of clip-guides extending each tangentially or at an acute angle to the strand-wire guides, whereby the clips are assembled astride the fence-wires, a series of feed gates or slides for feeding the clips one by one from each of said clip-guides, a series of stop gates or slides for arresting the clips, a series of clip carriers and holders, a sectional opening and closing two-part stay-wire guide, a series of pairs of dies, and devices for feeding the strand-wires, substantially as specified.

23. The combination with a series of strand-wire guides, of a series of clip-guides extending each tangentially or at an acute angle to the strand-wire guides, whereby the clips are assembled astride the fence-wires, a series of feed gates or slides for feeding the clips one by one from each of said clip-guides, a series of stop gates or slides for arresting the clips, a series of clip carriers and holders, a sectional opening and closing two-part stay-wire guide, a series of pairs of dies, devices for feeding the strand-wires, and devices for feeding the stay-wire, substantially as specified.

24. The combination with a series of strand-wire guides, of a series of clip-guides extending each tangentially or at an acute angle to the strand-wire guides, whereby the clips are assembled astride the fence-wires, a series of feed gates or slides for feeding the clips one by one from each of said clip-guides, a series of stop gates or slides for arresting the clips, a series of clip carriers and holders, a sectional opening and closing two-part stay-wire guide, a series of pairs of dies, devices for feeding the strand-wires, devices for feeding the stay-wire, and a take-up drum or reel, substantially as specified.

25. The combination with a series of strand-wire guides, of a series of clip-guides extending each tangentially or at an acute angle to the strand-wire guides, whereby the clips are assembled astride the fence-wires, a series of feed gates or slides for feeding the clips one by one from each of said clip-guides, a series of stop gates or slides for arresting the clips, a series of clip carriers and holders, a sectional opening and closing two-part stay-wire guide, a series of pairs of dies, devices for feeding the strand-wires, devices for feeding the stay-wire, and a folder for the free end of the stay-wire, substantially as specified.

26. The combination with a series of strand-wire guides, of a series of clip-guides extending each tangentially or at an acute angle to the strand-wire guides, whereby the clips are assembled astride the fence-wires, a series of feed gates or slides for feeding the clips one by one from each of said clip-guides, a series of stop gates or slides for arresting the clips, a series of clip carriers and holders, a sectional opening and closing two-part stay-wire guide, a series of pairs of dies, devices for feeding the strand-wires, devices for feeding the stay-wire, and a pair of knives for severing the stay from the stay-wire, substantially as specified.

27. The combination with a series of strand-wire guides, of a series of clip-guides extending each tangentially or at an acute angle to the strand-wire guides, whereby the clips are assembled astride the fence-wires, a series of feed gates or slides for feeding the clips one by one from each of said clip-guides, a series of stop gates or slides for arresting the clips, a series of clip carriers and holders, a sectional opening and closing two-part stay-wire guide, a series of pairs of dies, devices for feeding the strand-wires, devices for feeding the stay-wire, a pair of knives for severing the stay from the stay-wire, and a folder for the severed end of the stay, substantially as specified.

28. The combination with feed devices for the stay-wire, of a series of successively-acting pairs of dies for setting the clips, substantially as specified.

29. The combination with a sectional opening and closing two-part guide for the stay-wire, of a series of successively-acting pairs of dies for setting the clips, substantially as specified.

30. The combination with a sectional opening and closing two-part guide for the stay-wire, of a series of successively-acting pairs of dies for setting the clips, and a series of movable clip-holders, substantially as specified.

31. In a clip-stay-wire-fence machine, a pair of dies having die-cavities for simultaneously bending or shaping the clip, stay-wire, and strand-wire, in combination with means for automatically operating the same at intervals as required substantially as specified.

32. The combination with a clip-guide, of a box or magazine for containing the clips in bulk, and means for arranging and delivering the clips in position to enter said clip-guide, and mechanism for automatically vibrating or tilting said magazine substantially as specified.

33. A magazine or holder for assembling and delivering clips to a clip-guide having a longitudinal saddle-bar astride which the clips fall and slide upon in passing out of the magazine, and mechanism for automatically vibrating or tilting said magazine substantially as specified.

34. In a magazine or holder for assembling clips and delivering them to a guideway, a saddle-bar fixed in the bottom of the magazine in alinement with the gate for the escape of the clips, and a fixed guideway located to receive the clips in succession as they are discharged from the saddle-bar, and mechanism for automatically vibrating or tilting said magazine substantially as specified.

35. The combination with a magazine or hopper for holding and carrying a quantity of clips, of a slide for directing the fall of the clips in line to an escape-aperture, and said escape-aperture provided with a gate for shutting off the clips when desired, and mechanism for automatically vibrating or tilting said magazine substantially as specified.

36. The magazine or hopper for holding a quantity of clips, and mounted to be vibrated or oscillated in a manner to agitate the clips held therein, and having an escape-orifice so shaped that the clips can only escape therefrom in succession in regular order, combined with a guideway for receiving the clips as they escape from the way or guide, and mechanism for automatically vibrating or tilting said magazine substantially as specified.

37. The combination of a magazine or hopper for holding a quantity of clips, with mechanism for giving the hopper a vibrating or oscillating motion, an escape-orifice for the clips so shaped that the clips can escape only in succession and in regular position, a guideway for receiving the clips in the order that they escape from the magazine, with a gateway for shutting off the clips from the orifice actuated by coming in contact with the clips in the guideway when said guideway is filled therewith, substantially as specified.

38. The magazine or hopper for holding a quantity of clips mounted upon a shaft in a manner adapted to be oscillated or vibrated by the movement of the shaft, and having a clip passage-way for the escape of the clips from the magazine, and with a fixed guideway for receiving the clips as they escape from the magazine, said guideway adapted to receive the clips in a variety of positions of the magazine, substantially as specified.

39. The combination of a magazine or hopper for holding a quantity of clips, and mounted to be oscillated or vibrated in manner to agitate the clips within the hopper, with a guideway in the bottom of the hopper adapted to catch the clips in a determined position and direct their escape from the magazine in succession and regular order, an orifice so shaped as to permit the escape of the clips only in the position determined by the guideway, a fixed clip-guide for receiving the clips as they escape from the magazine, and mechanism for automatically vibrating or tilting said magazine substantially as specified.

40. The combination of a magazine or hopper for holding a quantity of clips and adapted to be vibrated or oscillated for the purpose of agitating the clips within the hopper, having an escape-orifice so shaped as to prevent the escape of the clips in all but a certain determined position, with a guideway for directing the clips to the escape-orifice in the desired position, and a fixed guideway for receiving the clips as they escape from the magazine, a gate for shutting off the escape of the clips from the magazine, said gateway being automatically operated by engagement with the clips held in the fixed guideway, and a stop for holding the said gate closed until the clips are discharged from the fixed guideway sufficiently to prevent their engagement with the gate, substantially as specified.

41. A magazine or hopper for holding a quantity of clips, and adapted to be vibrated or oscillated for the purpose of agitating the clips held therein, having a guideway and an escape-orifice adapted to direct any of the clips from the magazine, combined with a gate for shutting off the escape of the clips when desired, said gateway held normally open by a spring and locked shut at desired intervals by means of a stop and spring-catch, substantially as specified.

42. The combination with a magazine or hopper for holding a quantity of clips, and mounted in a manner to be vibrated or oscillated to agitate the clips held therein, of a guideway and escape-orifice so shaped as to permit the escape of the clips in a determined position only, a guideway for receiving the clips as they escape from the orifice, a gate for automatically shutting off the escape of the clips from the magazine, said gate mounted to be moved to a position in contact with the clips held in the receiving-guideway, and to engage any clips that may be located in its path and be moved thereby to a position shutting off the escape of the clips from the magazine, a lock for holding the said gate so closed until the clips in the receiving-guideway have passed beyond the point of engagement with the gate, and an unlocking-stop fixed in position to unlock the gate at certain intervals of the movement of the magazine and gate, substantially as specified.

43. A clip-guideway for holding the clips in succession in a determined position, combined with a clip-feed device mounted in the path of the guideway and adapted to disengage a single clip at a time, with a secondary clip-feed device for receiving the clips as they are disengaged by the first feed device and holding them in position to be acted upon by other mechanism of the machine and mechanism for alternately operating said feed devices substantially as specified.

44. A clip-guideway for holding the clips in succession in a determined position, combined with a clip-feed device located in the path of the guideway, and adapted to disengage a single clip at a time, with a secondary clip-feed device also located in the path of the guideway for receiving the clip as disengaged by the first feed device, said feed devices being operated alternately, substantially as specified.

45. The combination of a clip-guideway for holding the clips in succession in a determined position, with a strand-wire guideway whereby the strand-wire is directed in a position to be engaged by the clips as they descend in the clip-guideway, substantially as specified.

46. A clip-guideway adapted to hold the clips in succession and in a determined position combined with a strand-wire guideway merging into and forming a part of the clip-guideway, and a clip-feed device located at or near the final junction of the clip-guideway for the purpose of disengaging the clip from the clip-guideway and engaging it on the strand-wire, substantially as specified.

47. The combination with a clip-guideway for directing the clips in a position to engage the strand-wire, of a strand-wire guideway for directing the strand-wire in a position in relation to the clips as directed by the clip-guideway, and a clip-feed device adapted to hold the clip in exact position to engage the strand-wire, and also adapted to engage the strand-wire and hold it free to permit the clip to fall freely by gravity to the position upon the strand-wire, substantially as specified.

48. The combination with a clip-guideway for holding the clips in succession in a desired position, of a strand-wire guideway merging into and forming a part of the clip-guideway, with a clip-feed device for discharging the clip from the guideway, said device being composed of an upper apertured plate and a lower notched plate, the bottom of the notch of the lower notched plate being adapted to engage the strand-wire to hold it in registering position to be engaged by the clip, substantially as specified.

49. The combination of a clip-guideway for directing the clips in succession in a desired position, with a clip-feed device for disengaging a single clip at a time from the guideway, a strand-wire guideway for directing the strand-wire in position to be engaged by the clip as released from the clip-guideway by the clip-feed device, and a clip-holder for engaging the clip as discharged by the clip-feed device, substantially as specified.

50. The combination of a clip-guideway for holding the clips in succession in a desired position, with a feed device for disengaging a single clip at a time from a clip-guideway, a strand-wire guideway for directing the strand-wire to a position to be engaged with the clip as discharged from the clip-guideway by the clip-feed device, and a clip-holder for receiving the clip as discharged by the clip-feed device and holding it upon the strand-wire in a position of registration for receiving the stay-wire, substantially as specified.

51. The combination with a clip-guideway for directing the clips in succession in a desired position, of a clip-feed device for discharging a single clip at a time from the clip-guideway, a strand-wire guideway for directing the strand-wire in position to be engaged by the clip as discharged by the clip-feed device, a clip holder and carrier adapted to hold the clip in engagement with the strand-wire when the clip is discharged by the feed device, and adapted to be reciprocated and carry the clip to a position of registration to receive a stay-wire, substantially as specified.

52. The combination with a clip-guideway for directing the clips to a position upon the strand-wire, of a strand-wire guideway for directing the strand-wire to be engaged by the clip as delivered by the guideway, a clip holder and carrier for receiving the clip from the guideway and holding it in engagement with the strand-wire and carrying it to a position in advance of the clip-guideway, a stay-wire guideway adapted to direct the stay-wire through the clip so held upon the strand-wire by the holder and carrier in its advanced position, substantially as specified.

53. A clip carrier and holder made in two parts, one part adapted to reciprocate longitudinally to and from the other part, and both parts adapted to reciprocate vertically, substantially as specified.

54. A clip-holder made in two parts, one part adapted to move in relation to the other in engaging the clip, and one part provided with a surface or contact-point for engaging the strand-wire, and the other part provided with apertures for receiving and directing the stay-wire to a clear passage beside the strand-wire in threading the stay-wire through the clip so held by the clip-holder, substantially as specified.

55. A clip-holder made in two parts, one part of which is made to conform to the outer sides of the clip, and the other part to the inner sides, and the part which engages the inner sides being provided with a contact-point for engaging the strand-wire to hold it free of the apertures provided in the clip for the stay-wire, substantially as specified.

56. A clip-holder made in two parts movable in relation to each other, and shaped to engage and positively hold the clip when the two parts are together, and to release the clip when the parts are separted, in combination with means for automatically operating the same at intervals as required, substantially as specified.

57. The combination with a clip-guideway terminating at a clip-feed device, of a strand-wire guideway directing the strand-wire to a position at the clip-feed device, a stay-wire guideway located across the path of the strand-wire in advance of the clip-guideway, a clip-feed device, and a clip carrier and holder reciprocating to and from the clip-feed device and to and from the stay-wire guideway, substantially as specified.

58. In combination a clip-guideway for holding and delivering the clips in a desired position, a clip-feed device for disengaging a single clip at a time from the clip-guideway, a strand-wire guideway for directing the strand-wire to a position to be engaged by the clip at the clip-feed device, a clip holder and carrier for engaging the clip upon the strand-wire and carrying it to a forward position on the strand-wire, and a strand-wire-feed device operating to feed the strand-wire during the interval of movement of the clip-carrier, whereby the clip and the strand-wire move forward simultaneously, substantially as specified.

59. In combination a clip-guideway for directing the clips to a position of engagement with the strand-wire, a strand-wire guideway for directing the strand-wire to a position to be engaged by the clip and released from the clip-guideway, a die for setting the clip upon the strand-wire, located in the path of the strand-wire in advance of the clip-guideway, and a clip-carrier for carrying the clip from the terminus of the guideway to a position at the die, substantially as specified.

60. In combination a clip-guideway for directing the clips to a position to engage the strand-wire, a strand-wire guideway for directing the strand-wire to a position in relation to the clip as held by the clip-guideway, a stay-wire guideway located across the path of travel of the strand-wire in advance of the terminus of the clip-guideway, a die for setting the clip upon the strand-wire located adjacent to the line of the stay-wire guideway, and mechanism for carrying the clip from the terminus of the guideway to and in line with the stay-wire guideway, substantially as specified.

61. In combination a clip-guideway for directing the clips to a position of engagement with the strand-wire, a strand-wire guideway for directing the strand-wire to a position to be engaged by the clip held in the guideway, a stay-wire guideway for directing the travel of the stay-wire across the path of the strand-wire, a clip-holder for holding the clip upon the strand-wire after delivery by the clip-guide in registering position with the stay-wire guide, and devices for feeding the stay-wire through the stay-wire guide and the clip held by the clip-holder, substantially as specified.

62. In combination a stay-wire guide for guiding the stay-wire across the path of the strand-wires, a series of dies located adjacent to the stay-wire guide and along the path of travel of the strand-wires, a series of clip-holders for holding the clips in engagement upon the strand-wires and in line with the stay-wire guideway, said clip-holder being adapted to hold the clip during the threading of the stay-wire through the clip, and to release the clip and move clear therefrom after the threading, and a series of movable dies or slides adapted to swage and bend the clip and stay-wire to a locking position upon the strand-wire, substantially as specified.

63. In combination a stay-wire guideway for guiding the travel of the stay-wire across the paths of the strand-wires, a series of dies fixed adjacent to the path of the stay-wire, mechanism for holding the clips upon the strand-wires in registering position with the stay-wire guideway, whereby the stay-wire may be directed through the apertures in the clips, with a series of reciprocating dies or slides adapted to move forward and swage and bend the clips and stay-wire after the threading of the stay-wire, substantially as specified.

64. In combination a stay-wire guideway for directing the travel of the stay-wire across the paths of travel of the strand-wires, a series of fixed dies located adjacent to the stay-wire guideway, a series of movable dies or slides adapted to engage the clips and wire between it and the fixed dies for the purpose of setting the clips and stay-wires upon the strand-wires, in combination with mechanism for automatically operating the movable dies at intervals, substantially as specified.

65. In combination a stay-wire guideway for directing the path of travel of the stay-wire across the paths of travel of the strand-wires, a series of fixed dies located adjacent to the stay-wire guideway, with a series of reciprocating dies adapted to coact with the fixed dies in setting the clips and stay-wire upon the strand-wires, with means for operating successively the reciprocating dies in order that the surplus wire required for the bending of the stay-wire in the fixing of the strand-wire may be drawn from the stay-wire stock without excessive stretch of the stay, substantially as specified.

66. In a clip-stay-wire-fence machine, the combination with a sectional guide for the stay-wire, of a series of pairs of dies operating between the sections of said guide and adapted each pair to simultaneously bend or shape the clip and strand-wire, substantially as specified.

67. In a clip-stay-wire-fence machine, the combination with a series of strand-wire guides, of a series of clip-guides, a stay-wire guide, devices for holding a series of clips in line with each other astride the strand-wires, and means for feeding the stay-wire alternately for a long and short stay, substantially as specified.

68. The combination with guides for a series of strand-wires, of guides for a series of clips, a guide for the strand-wire, a device for holding a series of clips in line with each other astride the strand-wires, and means for alternately shutting off certain of the clip-guides, to adapt the mechanism to apply alternately long and short stays, substantially as specified.

69. The combination with a series of clip-guides, of means for alternately shutting off certain of said guides to adapt the mechanism to apply long and short stays, substantially as specified.

70. The combination with a stay-wire guide, of feed devices or rolls for the stay-wire, a series of successively-acting dies for setting the clips, and means for relieving the tension or grip of the feed rolls or devices on the stay-wire when the dies are operating, substantially as specified.

71. The combination with a series of dies for setting a series of clips on a series of strand-wires and a stay-wire, of a pair of folders for bending the two ends of the stay about the marginal clips, substantially as specified.

72. The combination with a series of clip-setting dies, of mechanism for successively operating the dies, substantially as specified.

73. In a clip-stay-wire-fence machine, the combination with a series of strand-wire guides, of a series of clip-holders reciprocating longitudinally of the strand-wires, substantially as specified.

74. In a clip-stay-wire-fence machine, the combination with a series of strand-wire guides, of a series of clip-holders reciprocating longitudinally of the strand-wires, and to and from the same, substantially as specified.

75. In a clip-stay-wire-fence machine, the combination with a series of strand-wire guides, of a series of clip-holders reciprocating longitudinally of the strand-wires, and a guide for the stay-wire having a movable part to permit the guide to release the stay, substantially as specified.

76. In a clip-stay-wire-fence machine, the combination with a series of strand-wire guides, of a series of clip-holders reciprocating longitudinally of the strand-wires, a guide for the stay-wire having a movable part to permit the guide to release the stay, and a take-up drum or reel, substantially as specified.

77. The combination with a clip-guide, of a strand-wire guide and two pairs of clip-feed gates or slides, and means for alternately operating said pairs of feed gates or slides, substantially as specified.

78. The combination with a clip-guide, of a strand-wire guide, and a movable clip-holder, and a stay-wire guide, substantially as specified.

79. The combination with a clip-guide, of a strand-wire guide, a movable clip-holder, a stay-wire guide, and a stay-wire-feed device, substantially as specified.

80. The combination with a clip-guide, of a strand-wire guide, a movable clip-holder, a stay-wire guide, a stay-wire-feed device, and a pair of dies for setting the clips, substantially as specified.

81. The combination with a clip-guide, of a strand-wire guide, a movable clip-holder, a stay-wire guide, a stay-wire-feed device, a pair of dies for setting the clips, and a folder for bending the end of the stay about the clip, substantially as specified.

82. The combination with a clip-guide, of a strand-wire guide, a movable clip-holder, a stay-wire guide, a stay-wire-feed device, a pair of dies for setting the clips, a folder for bending the end of the stay about the clip, and a pair of knives for severing the stay from the stay-wire, substantially as specified.

83. The combination, in a clip-stay-wire-fence machine, of a stay-wire guide, with a pair of cutters for severing the stay from the stay-wire, one of said cutters having a rotary movement to enable it to also serve as a folder to bend the severed end of the stay about the clips, substantially as specified.

84. The combination with stay-wire-feed devices, of a rotary cutter and folder operating to both sever the stay and fold or bend its severed end, substantially as specified.

85. A knockdown take-up drum for a woven or stay wire fence machine, comprising a fixed rotary head, a reciprocating rotary head, a series of loose connecting-bars fitting in recesses in said heads, and a non-reciprocating spider rotating with one of said heads, and adapted to engage the ends of said loose bars to free them from the sliding head when it is withdrawn, substantially as specified.

86. A stay-wire guide, in a fence-machine, in two parts, one part of which is composed of a groove of a section to conform to the stay-wire, and the other part having a flat surface permitting the parts to be articulated in contact with each other without binding upon the stay-wire, substantially as specified.

87. A stay-wire guideway made in two parts, one part having a flat surface and fixed rigidly to the frame and the movable part provided with a groove for engaging the stay-wire and carrying it with it in releasing the stay-wire from the guideway, substantially as specified.

88. The combination of a stay-wire guideway made in two parts, one part fixed and the other movable, the movable part having a groove which engages and carries with it the stay-wire in its movements, with a series of dies located adjacent to the stay-wire guideway, whereby a bend or set is made in or upon the stay-wire by the die, and mechanism for moving the movable part of the stay-wire guideway, whereby it carries the stay-wire free from the die, substantially as specified.

89. In combination with a series of strand-wire-feed devices, of a stay-wire guideway having a movable part adapted to move the stay-wire in order to release it from the stay-wire guideway, means for moving the stay-wire guideway to release the stay-wire and hold it free to move at the period of operation of the strand-wire-feed devices, whereby the stay is permitted to move in conjunction with the strand-wires, substantially as specified.

90. The combination of a stay-wire guideway with a series of dies located adjacent to the stay-wire guideway, and a series of movable dies coacting therewith in setting the stay-wire upon the strand-wire, and said stay-wire guide provided with engaging surfaces for coacting with the dies in bending and setting the stay-wire to the desired form, substantially as specified.

91. The combination of a set of dies for setting the clips and strand-wires upon the stay-wire, with a folder for folding over the end of the stay-wire upon the clip, said folder acting upon the stay-wire during the period of the pressure or set of the dies, substantially as specified.

92. The combination of a set of dies for setting the clip and stay-wire upon the strand-wire, with a folder for folding the end of the stay-wire upon the clip, said folder being pivoted to turn upon an axis in folding the end of the stay-wire, substantially as specified.

93. The combination with mechanism for setting the clip and stay-wire about the strand-wire, a pivoted folder adapted to swing about a pivot and fold over the end of the stay-wire for the purpose of making a secure joint at the marginal wire, substantially as specified.

94. A pivoted folder adapted to swing about a pivot in folding over the end of the stay-wire, and provided with a cutting edge for severing the stay-wire the desired length for the purpose of folding, substantially as specified.

95. The combination with a pivoted folder and cutter for cutting and folding the ends of the stay-wire, a fixed knife coacting with the cutting edge of the folder and also serving as a guide for directing the feed of the stay-wire stock, substantially as specified.

96. A stay-wire folder for folding the end of the stay-wire and mounted to swing about a pivot in so doing, a lever connected to the folder and pivoted to a reciprocating rod for actuating the folder, substantially as specified.

97. In combination with a folder for folding over the end of the stay-wire, a set of dies for setting and holding the stay-wire upon the strand-wire, one of which is provided with a cavity adapted to permit the folder to enter in folding the stay-wire, substantially as specified.

98. In combination with a stay-wire guideway, a series of dies located adjacent to the stay-wire guideway for setting the clips and stay-wire upon the strand-wire, of a cutter for the stay-wire located adjacent to the stay-wire guideway and adapted to act upon the stay-wire while held in the guideway, and a folder for folding over the end of the stay-wire before the stay-wire is released by the dies and stay-wire guideway, substantially as specified.

99. The combination of a stay-wire-fence mechanism having two independent feeding devices engaging the stay-wire with mechanism for alternately engaging with the wire each of said two sets of feeding devices, substantially as specified.

100. The combination with a pair of feed-rolls, of a driving-shaft for one of them provided with a universal joint, and the bearing for this shaft adjacent to the roll provided with an adjustable box whereby rolls of different diameters may be placed upon the shaft without changing the location in relation to the frame of the point of contact of the rolls with the stay-wire, substantially as specified.

101. The combination of a set of feed-rolls for the stay-wire, with a rocker-shaft for tightening the rolls upon the stay-wire, said rocker-shaft being operated by a cam which varies the tension of the rolls at each interval of operation of the rolls, substantially as specified.

102. The combination with two sets of feeding-rolls for the stay-wire, of a rocker-shaft for alternately tightening the pairs of feed-rolls, substantially as specified.

103. In combination with two sets of feeding-rolls for the stay-wire, a rocker-shaft for alternately tightening each set of rolls, and a cam for actuating the rocker-shaft, and provided with two cam-tracks alternately in engagement with the rocker-shaft, substantially as specified.

104. In combination with a take-up drum for the finished fabric, a longitudinally-movable head for engaging the drum, and an ejector provided with projections for discharging the drum from the head during the movement of the head, substantially as specified.

105. In combination with the drum for taking up the finished fabric, a longitudinally-movable head for engaging the drum, and an ejector for discharging the drum from the head located upon the shaft carrying the head and rotating therewith, substantially as specified.

106. In combination with the drum for taking up the finished fabric, a longitudinally-movable head for engaging the drum, and an ejector for discharging the drum, from the head, located upon the shaft carrying the head and rotating therewith, and a lever for moving the drum-head shaft, substantially as specified.

107. The combination with a stay-wire-feed mechanism adapted to alternately feed a long and a short stay, clip-feed devices adapted to feed alternately a greater and less number of clips to suit the requirements of the different length of stays, substantially as specified.

108. In combination with a series of clip-feed devices adapted each to feed single clips at a time, a slide or gate for shutting off alternately a portion of the clips, a stay-wire-feed mechanism, substantially as specified.

109. In combination with a series of sets of feed-rolls for feeding the strand-wires, a counter-shaft intermediately transmitting the power from the driving member to the feed-rolls, an interchangeable gearing for connecting this counter-shaft with the feed-roll shaft, whereby the amount of travel of the feed-rolls may be varied for the purpose of differently spacing the stay-wires upon the strand-wires, substantially as specified.

110. In combination with the large spur-gear-driving cam-shaft, a small driving-pinion by which motion is imparted to the large gear of the machine, a mutilated gear mounted to be operated intermittently from the teeth of the large gear, a large tooth and a mutilated flange upon a large gear, and a large tooth and a stop-block upon the mutilated gear, whereby the intermittent motion is transmitted from the large gear to the mutilated gear, and the pinion is permitted to drive the large gear at all times, substantially as specified.

111. In combination with a series of progressively-operated dies or slides, a bar for automatically and simultaneously retracting the dies or slides, and mechanism for operating the bar, substantially as specified.

112. In combination with a series of dies or slides, a series of cams for actuating the dies in their forward movement, and a bar for retracting the dies independently of their cams, substantially as specified.

113. In a clip-stay-wire-fence machine, a series of pairs of dies having each die-cavities for simultaneously bending both the strand-wire and the stay-wire, in combination with means for automatically operating the same at intervals as required, substantially as specified.

114. In a woven-wire-fence machine, the combination with a series of devices for making bends in a series of strand-wires, with a series of devices for making a series of bends in a stay-wire, and mechanism for automatically operating said series of devices, substantially as specified.

115. In a woven-wire-fence machine, the combination with a series of devices for making bends in a series of strand-wires, with a series of devices for making a series of bends in a stay-wire, and a series of devices for bending a series of clips to secure them on the stay and strand wires at the crossings thereof, and mechanism for automatically operating said series of devices, substantially as specified.

WILLIAM ERASTUS WILLIAMS.

Witnesses:
EDMUND ADCOCK,
H. M. MUNDAY.